US012047899B2

(12) United States Patent
Khoryaev et al.

(10) Patent No.: US 12,047,899 B2
(45) Date of Patent: Jul. 23, 2024

(54) TECHNIQUES FOR SUPPORTING LOW LATENCY NR POSITIONING PROTOCOLS

(71) Applicant: Intel Corporation, Santa Clara, CA (US)

(72) Inventors: Alexey Khoryaev, Nizhny Novgorod (RU); Artyom Lomayev, Nizhny Novgorod (RU); Andrey Chervyakov, Nizhny Novgorod (RU); Sergey Sosnin, Zavolzhie (RU)

(73) Assignee: Intel Corporation, Santa Clara, CA (US)

( * ) Notice: Subject to any disclaimer, the term of this patent is extended or adjusted under 35 U.S.C. 154(b) by 176 days.

(21) Appl. No.: 17/501,592

(22) Filed: Oct. 14, 2021

(65) Prior Publication Data

US 2022/0053450 A1 Feb. 17, 2022

Related U.S. Application Data

(60) Provisional application No. 63/092,429, filed on Oct. 15, 2020.

(51) Int. Cl.
*H04W 64/00* (2009.01)
*H04L 5/00* (2006.01)
*H04W 24/10* (2009.01)
*H04W 84/04* (2009.01)

(52) U.S. Cl.
CPC ........... *H04W 64/00* (2013.01); *H04L 5/0048* (2013.01); *H04W 24/10* (2013.01); *H04W 84/042* (2013.01)

(58) Field of Classification Search
CPC ... H04W 64/00; H04W 24/10; H04W 84/042; H04L 5/0048; H04L 5/005; H04L 5/0053; G01S 5/0036; G01S 5/0236; G01S 5/04; G01S 5/06; G01S 5/08; G01S 5/10; G01S 13/765; G01S 13/878
See application file for complete search history.

(56) References Cited

U.S. PATENT DOCUMENTS

| | | | |
|---|---|---|---|
| 2019/0037525 A1* | 1/2019 | Liu | G01S 5/0036 |
| 2020/0245372 A1* | 7/2020 | Lei | H04L 27/2602 |
| 2021/0206211 A1* | 7/2021 | Ribreau | H04L 67/12 |
| 2023/0276398 A1* | 8/2023 | Berggren | H04W 4/029 |
| | | | 455/456.1 |

(Continued)

*Primary Examiner* — Siu M Lee
(74) *Attorney, Agent, or Firm* — Schwegman Lundberg & Woessner, P.A.

(57) ABSTRACT

A non-transitory computer-readable storage medium stores instructions for execution by one or more processors of a UE. The instructions configure the UE for low latency NR positioning in a 5G NR network and cause the UE to perform operations comprising decoding configuration signaling received from a base station. The configuration signaling includes measurement gap information and scheduling information for a UE measurement report. A downlink (DL) positioning reference signal (PRS) received from the base station is decoded. Positioning measurements are performed using the DL PRS. The positioning measurements are performed based on a measurement gap corresponding to the measurement gap information. The UE measurement report is encoded for a UL transmission to the base station based on the scheduling information. The UE measurement report includes the positioning measurements.

20 Claims, 21 Drawing Sheets

Example of the enhanced Multi-RTT
UE Assisted Procedure

(56) References Cited

U.S. PATENT DOCUMENTS

| | | | |
|---|---|---|---|
| 2023/0300674 A1* | 9/2023 | Kedalagudde | H04W 24/10 370/230.1 |
| 2023/0319764 A1* | 10/2023 | Shreevastav | H04L 5/0057 455/456.1 |
| 2023/0345408 A1* | 10/2023 | Thomas | H04W 64/00 |
| 2023/0379860 A1* | 11/2023 | Rao | H04W 64/00 |

* cited by examiner

Example of the enhanced DL-TDOA/DL-AOD UE Assisted Procedure

Example of the enhanced UL-TDOA/UL-AOA UE Assisted Procedure

Example of the enhanced UL-TDOA/UL-AOA UE Based Procedure

Example of the enhanced Multi-RTT UE Assisted Procedure

Example of the enhanced Multi-RTT UE Based Procedure

TECHNIQUES FOR SUPPORTING LOW LATENCY NR POSITIONING PROTOCOLS

PRIORITY CLAIM

This application claims the benefit of priority to U.S. Provisional Patent Application 63/092,429, filed Oct. 15, 2020, and entitled "METHODS TO SUPPORT LOW LATENCY NR POSITIONING PROTOCOLS," which patent application is incorporated herein by reference in its entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, (MulteFire, LTE-U), and fifth-generation (5G) networks including 5G new radio (NR) (or 5G-NR) networks, 5G-LTE networks such as 5G NR unlicensed spectrum (NR-U) networks and other unlicensed networks including Wi-Fi, CBRS (OnGo), etc. Other aspects are directed to techniques for supporting low latency NR positioning protocols in 5G-NR networks, including 5G non-terrestrial networks (NTNs).

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in many disparate environments. Fifth-generation (5G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in the unlicensed spectrum without requiring an "anchor" in the licensed spectrum, called MulteFire. Further enhanced operation of LTE and NR systems in the licensed, as well as unlicensed spectrum, is expected in future releases and 5G systems. Such enhanced operations can include techniques for supporting low latency NR positioning protocols in 5G-NR networks, including 5G NTNs.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in or substituted for, those of other aspects. Aspects outlined in the claims encompass all available equivalents of those claims.

Figure 1A:
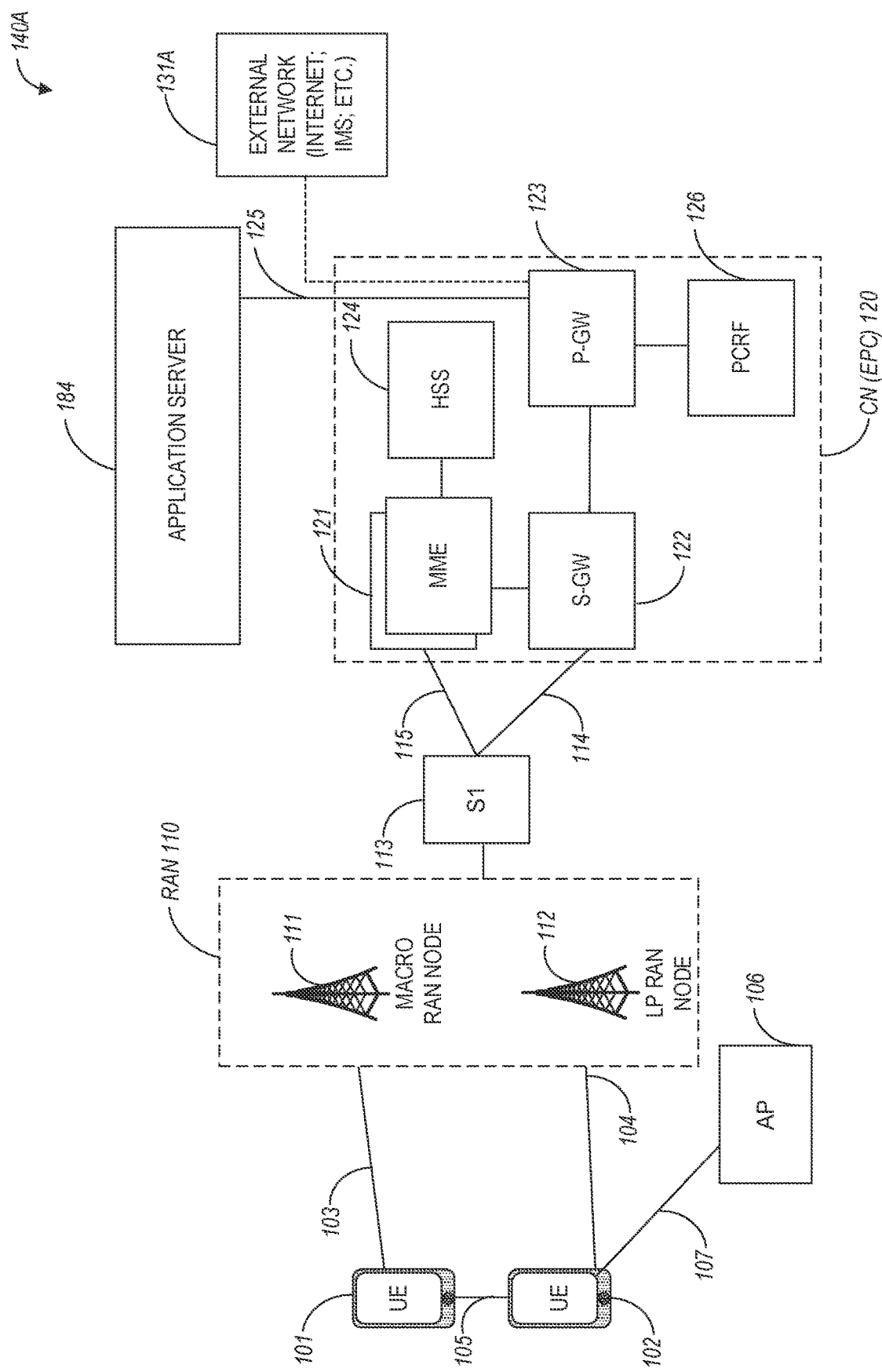
FIG. 1A illustrates an architecture of a network, in accordance with some aspects.

FIG. 1A illustrates an architecture of a network in accordance with some aspects. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies).

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe), or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, a Universal Mobile Telecommunications System (UMTS), an Evolved Universal Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable connections 103 and 104. These access nodes (ANs) can be referred to as base stations (BSs), NodeBs, evolved NodeBs (eNBs), Next Generation NodeBs (gNBs), RAN network nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112 or an unlicensed spectrum based secondary RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management, and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries user traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and route data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include lawful intercept, charging, and some policy enforcement.

The P-GW 123 may terminate an SGi interface toward a PDN.

The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including a 5G new radio network using communications in the licensed (5G NR) and the unlicensed (5G NR-U) spectrum. One of the current enablers of IoT is the narrowband-IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, a RAN network node, and so forth. In some aspects, a gNB can be a master node (MN) and NG-eNB can be a secondary node (SN) in a 5G architecture. In some aspects, the master/primary node may operate in a licensed band and the secondary node may operate in an unlicensed band.

Figure 1B:
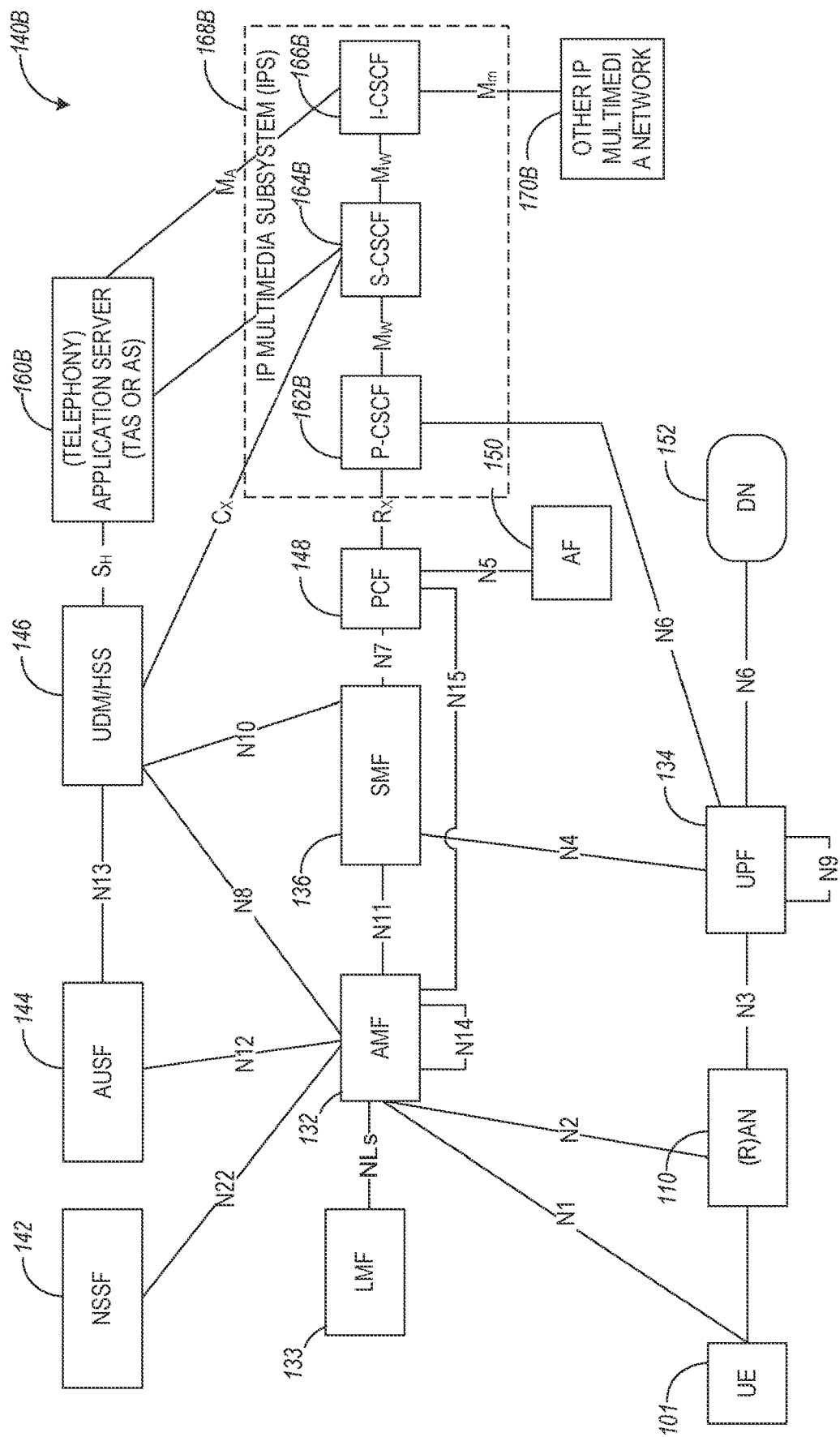
FIG. 1B and FIG. 1C illustrate a non-roaming 5G system architecture in accordance with some aspects.

FIG. 1B illustrates a non-roaming 5G system architecture in accordance with some aspects. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (AMF) 132, location management function (LMF) 133, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The LMF 133 may be used in connection with 5G positioning functionalities. In some aspects, LMF 133 receives measurements and assistance information from the next generation radio access network (NG-RAN) 110 and the mobile device (e.g., UE 101) via the AMF 132 over the NLs interface to compute the position of the UE 101. In some aspects, NR positioning protocol A (NRPPa) may be used to carry the positioning information between NG-RAN and LMF 133 over a next generation control plane interface (NG-C). In some aspects, LMF 133 configures the UE using the LTE positioning protocol (LPP) via AMF 132. The NG RAN 110 configures the UE 101 using radio resource control (RRC) protocol over LTE-Uu and NR-Uu interfaces.

In some aspects, the 5G system architecture 140B configures different reference signals to enable positioning measurements. Example reference signals that may be used for positioning measurements include the positioning reference signal (NR PRS) in the downlink and the sounding reference signal (SRS) for positioning in the uplink. The downlink positioning reference signal (PRS) is a reference signal configured to support downlink-based positioning methods.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
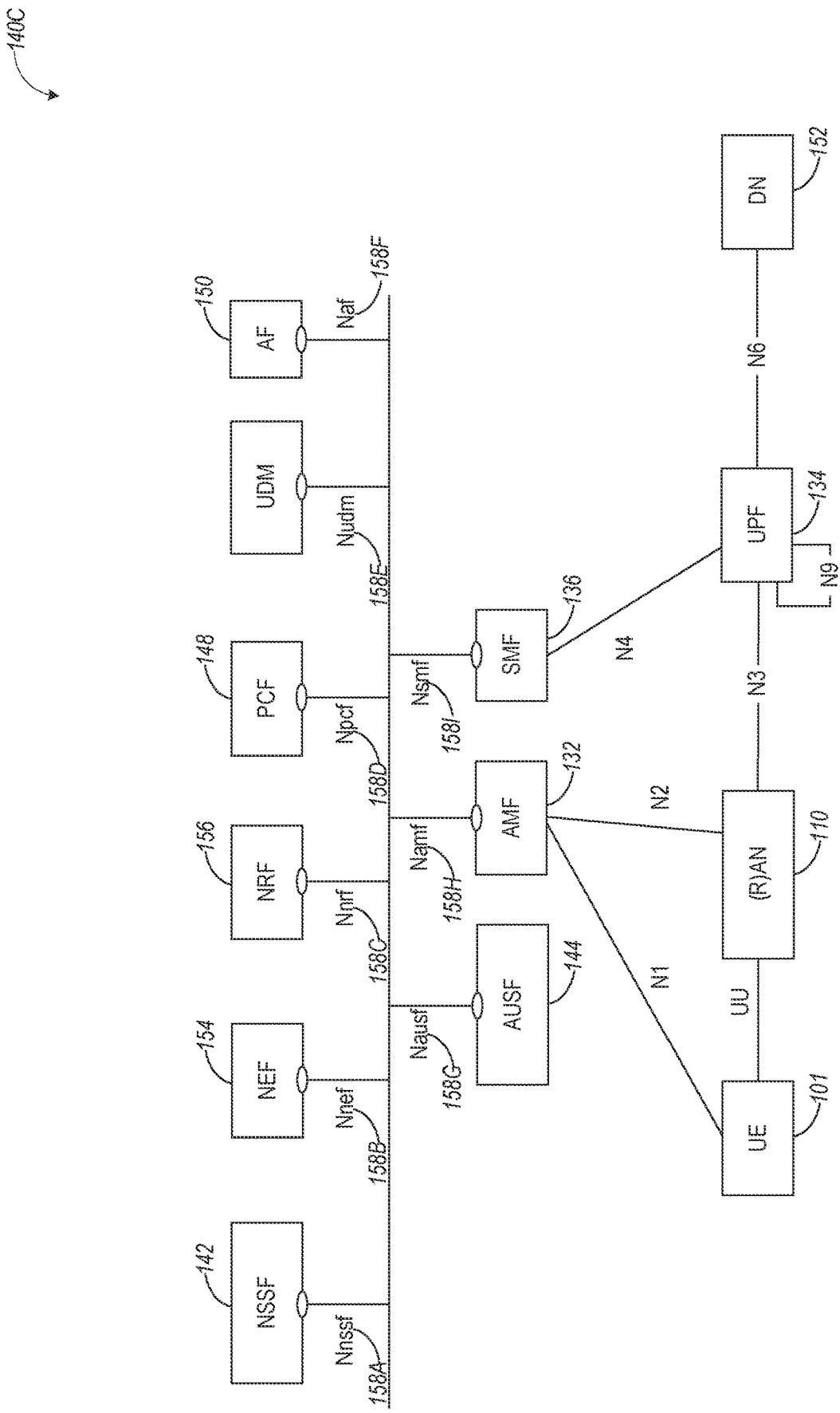

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

FIG. 2, FIG. 3, FIG. 4, FIG. 5, FIG. 6, FIG. 7, FIG. 8, and FIG. 9 illustrate various systems, devices, and components that may implement aspects of disclosed embodiments in different communication systems, such as 5G-NR networks including 5G non-terrestrial networks (NTNs). UEs, base stations (such as gNBs), and/or other nodes (e.g., satellites or other NTN nodes) discussed in connection with FIGS. 1A-9 can be configured to perform the disclosed techniques.

Figure 2:
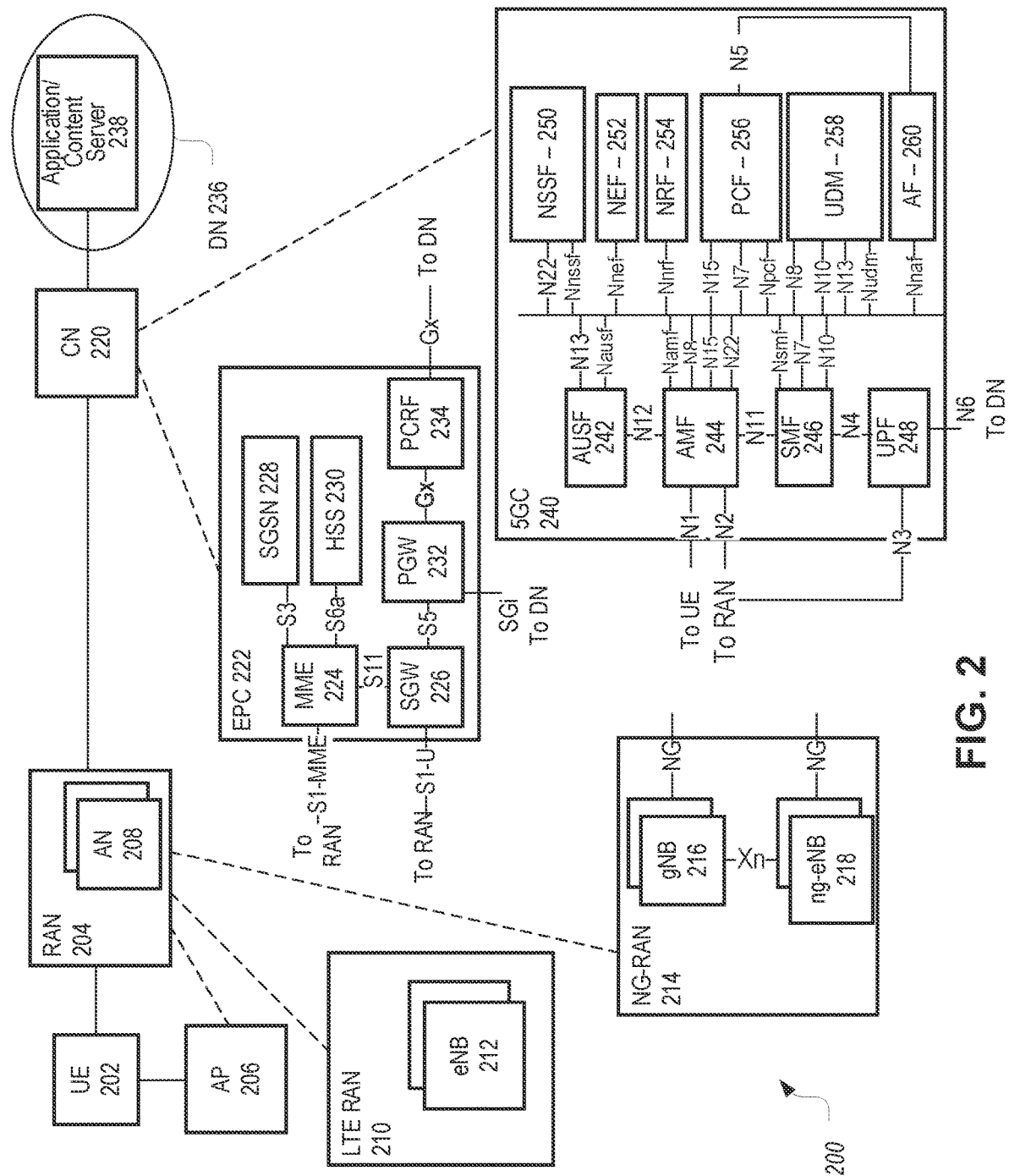
FIG. 2, FIG. 3, and FIG. 4 illustrate various systems, devices, and components that may implement aspects of disclosed embodiments.

FIG. 2 illustrates a network 200 in accordance with various embodiments. The network 200 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 200 may include a UE 202, which may include any mobile or non-mobile computing device designed to communicate with a RAN 204 via an over-the-air connection. The UE 202 may be, but is not limited to, a smartphone, tablet computer, wearable computing device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 200 may include a plurality of UEs coupled directly with one another via a sidelink interface. The UEs may be M2M/D2D devices that communicate using physical sidelink channels such as but not limited to, PSBCH, PSDCH, PSSCH, PSCCH, PSFCH, etc.

In some embodiments, the UE 202 may additionally communicate with an AP 206 via an over-the-air connection. The AP 206 may manage a WLAN connection, which may serve to offload some/all network traffic from the RAN 204. The connection between the UE 202 and the AP 206 may be consistent with any IEEE 802.11 protocol, wherein the AP 206 could be a wireless fidelity (Wi-Fi®) router. In some embodiments, the UE 202, RAN 204, and AP 206 may utilize cellular-WLAN aggregation (for example, LWA/LWIP). Cellular-WLAN aggregation may involve the UE 202 being configured by the RAN 204 to utilize both cellular radio resources and WLAN resources.

The RAN 204 may include one or more access nodes, for example, access node (AN) 208. AN 208 may terminate air-interface protocols for the UE 202 by providing access stratum protocols including RRC, Packet Data Convergence Protocol (PDCP), Radio Link Control (RLC), MAC, and L1 protocols. In this manner, the AN 208 may enable data/voice connectivity between the core network (CN) 220 and the UE 202. In some embodiments, the AN 208 may be implemented in a discrete device or as one or more software entities running on server computers as part of, for example, a virtual network, which may be referred to as a CRAN or virtual baseband unit pool. The AN 208 be referred to as a BS, gNB, RAN node, eNB, ng-eNB, NodeB, RSU, TRxP, TRP, etc. The AN 208 may be a macrocell base station or a low-power base station for providing femtocells, picocells, or other like cells having smaller coverage areas, smaller user capacity, or higher bandwidth compared to macrocells.

In embodiments in which the RAN 204 includes a plurality of ANs, they may be coupled with one another via an X2 interface (if the RAN 204 is an LTE RAN) or an Xn interface (if the RAN 204 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 204 may each manage one or more cells, cell groups, component carriers, etc. to provide the UE 202 with an air interface for network access. The UE 202 may be simultaneously connected with a plurality of cells provided by the same or different ANs of the RAN 204. For example, the UE 202 and RAN 204 may use carrier aggregation to allow the UE 202 to connect with a plurality of component carriers, each corresponding to a Pcell or Scell. In dual connectivity scenarios, a first AN may be a master node that provides an MCG and a second AN may be a secondary node that provides an SCG. The first/second ANs may be any combination of eNB, gNB, ng-eNB, etc.

The RAN 204 may provide the air interface over a licensed spectrum or an unlicensed spectrum. To operate in the unlicensed spectrum, the nodes may use LAA, eLAA, and/or feLAA mechanisms based on CA technology with PCells/Scells. Before accessing the unlicensed spectrum, the nodes may perform medium/carrier-sensing operations based on, for example, a listen-before-talk (LBT) protocol.

In V2X scenarios, the UE 202 or AN 208 may be or act as a roadside unit (RSU), which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high-speed events, such as crash avoidance, traffic warnings, and the like. Additionally, or alternatively, the RSU may provide other cellular/WLAN communications services. The components of the RSU may be packaged in a weatherproof enclosure suitable for outdoor installation and may include a network interface controller to provide a wired connection (e.g., Ethernet) to a traffic signal controller or a backhaul network.

In some embodiments, the RAN 204 may be an LTE RAN 210 with eNBs, for example, eNB 212. The LTE RAN 210 may provide an LTE air interface with the following characteristics: sub-carrier spacing (SCS) of 15 kHz; CP-OFDM waveform for downlink (DL) and SC-FDMA waveform for uplink (UL); turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operate on sub-6 GHz bands.

In some embodiments, the RAN 204 may be an NG-RAN 214 with gNBs, for example, gNB 216, or ng-eNBs, for example, ng-eNB 218. The gNB 216 may connect with 5G-enabled UEs using a 5G NR interface. The gNB 216 may connect with a 5G core through an NG interface, which may include an N2 interface or an N3 interface. The ng-eNB 218 may also connect with the 5G core through an NG interface but may connect with a UE via an LTE air interface. The gNB 216 and the ng-eNB 218 may connect over an Xn interface.

In some embodiments, the NG interface may be split into two parts, an NG user plane (NG-U) interface, which carries traffic data between the nodes of the NG-RAN 214 and a UPF 248 (e.g., N3 interface), and an NG control plane (NG-C) interface, which is a signaling interface between the nodes of the NG-RAN 214 and an AMF 244 (e.g., N2 interface).

The NG-RAN 214 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS but may use PBCH DMRS for PBCH demodulation; PTRS for phase tracking for PDSCH and tracking reference signal for time tracking. The 5G-NR air interface may operate on FR1 bands that include sub-6 GHz bands or FR2 bands that include bands from 24.25 GHz to 52.6 GHz. The 5G-NR air interface may include a synchronization signal and physical broadcast channel (SS/PBCH) block (SSB) that is an area of a downlink resource grid that includes PSS/SSS/PBCH.

In some embodiments, the 5G-NR air interface may utilize BWPs (bandwidth parts) for various purposes. For example, BWP can be used for dynamic adaptation of the SCS. For example, the UE 202 can be configured with multiple BWPs where each BWP configuration has a different SCS. When a BWP change is indicated to the UE 202, the SCS of the transmission is changed as well. Another use case example of BWP is related to power saving. In particular, multiple BWPs can be configured for the UE 202 with different amounts of frequency resources (for example, PRBs) to support data transmission under different traffic loading scenarios. A BWP containing a smaller number of PRBs can be used for data transmission with a small traffic load while allowing power saving at the UE 202 and in some cases at the gNB 216. A BWP containing a larger number of PRBs can be used for scenarios with higher traffic loads.

The RAN 204 is communicatively coupled to CN 220 that includes network elements to provide various functions to support data and telecommunications services to customers/subscribers (for example, users of UE 202). The components of the CN 220 may be implemented in one physical node or separate physical nodes. In some embodiments, NFV may be utilized to virtualize any or all of the functions provided by the network elements of the CN 220 onto physical compute/storage resources in servers, switches, etc. A logical instantiation of the CN 220 may be referred to as a network slice, and a logical instantiation of a portion of the CN 220 may be referred to as a network sub-slice.

In some embodiments, the CN 220 may be connected to the LTE radio network as part of the Enhanced Packet System (EPS) 222, which may also be referred to as an EPC (or enhanced packet core). The EPC 222 may include MME 224, SGW 226, SGSN 228, HSS 230, PGW 232, and PCRF 234 coupled with one another over interfaces (or "reference points") as shown. Functions of the elements of the EPC 222 may be briefly introduced as follows.

The MME 224 may implement mobility management functions to track the current location of the UE 202 to facilitate paging, bearer activation/deactivation, handovers, gateway selection, authentication, etc.

The SGW 226 may terminate an S1 interface toward the RAN and route data packets between the RAN and the EPC 222. The SGW 226 may be a local mobility anchor point for inter-RAN node handovers and also may provide an anchor for inter-3GPP mobility. Other responsibilities may include lawful intercept, charging, and some policy enforcement.

The SGSN 228 may track the location of the UE 202 and perform security functions and access control. In addition, the SGSN 228 may perform inter-EPC node signaling for mobility between different RAT networks; PDN and S-GW selection as specified by MME 224; MME selection for handovers; etc. The S3 reference point between the MME 224 and the SGSN 228 may enable user and bearer information exchange for inter-3GPP access network mobility in idle/active states.

The HSS 230 may include a database for network users, including subscription-related information to support the network entities' handling of communication sessions. The HSS 230 can provide support for routing/roaming, authentication, authorization, naming/addressing resolution, location dependencies, etc. An S6a reference point between the HSS 230 and the MME 224 may enable the transfer of subscription and authentication data for authenticating/authorizing user access to the LTE CN 220.

The PGW 232 may terminate an SGi interface toward a data network (DN) 236 that may include an application/content server 238. The PGW 232 may route data packets between the LTE CN 220 and the data network 236. The PGW 232 may be coupled with the SGW 226 by an S5 reference point to facilitate user plane tunneling and tunnel management. The PGW 232 may further include a node for policy enforcement and charging data collection (for example, PCEF). Additionally, the SGi reference point between the PGW 232 and the data network 236 may be an operator external public, a private PDN, or an intra-operator packet data network, for example, for provision of IMS services. The PGW 232 may be coupled with a PCRF 234 via a Gx reference point.

The PCRF 234 is the policy and charging control element of the LTE CN 220. The PCRF 234 may be communicatively coupled to the app/content server 238 to determine appropriate QoS and charging parameters for service flows. The PCRF 234 may provision associated rules into a PCEF (via Gx reference point) with appropriate TFT and QCI.

In some embodiments, the CN 220 may be a 5GC 240. The 5GC 240 may include an AUSF 242, AMF 244, SMF 246, UPF 248, NSSF 250, NEF 252, NRF 254, PCF 256, UDM 258, and AF 260 coupled with one another over interfaces (or "reference points") as shown. Functions of the elements of the 5GC 240 may be briefly introduced as follows.

The AUSF 242 may store data for authentication of UE 202 and handle authentication-related functionality. The AUSF 242 may facilitate a common authentication framework for various access types. In addition to communicating with other elements of the 5GC 240 over reference points as shown, the AUSF 242 may exhibit a Nausf service-based interface.

The AMF 244 may allow other functions of the 5GC 240 to communicate with the UE 202 and the RAN 204 and to subscribe to notifications about mobility events with respect to the UE 202. The AMF 244 may be responsible for registration management (for example, for registering UE 202), connection management, reachability management, mobility management, lawful interception of AMF-related events, and access authentication and authorization. The AMF 244 may provide transport for SM messages between the UE 202 and the SMF 246, and act as a transparent proxy for routing SM messages. AMF 244 may also provide transport for SMS messages between UE 202 and an SMSF. AMF 244 may interact with the AUSF 242 and the UE 202 to perform various security anchor and context management functions. Furthermore, AMF 244 may be a termination point of a RAN CP interface, which may include or be an N2 reference point between the RAN 204 and the AMF 244; and the AMF 244 may be a termination point of NAS (N1) signaling, and perform NAS ciphering and integrity protection. AMF 244 may also support NAS signaling with the UE 202 over an N3 IWF interface.

The SMF 246 may be responsible for SM (for example, session establishment, tunnel management between UPF 248 and AN 208); UE IP address allocation and management (including optional authorization); selection and control of UP function; configuring traffic steering at UPF 248 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 244 over N2 to AN 208; and determining SSC mode of a session. SM may refer to the management of a PDU session, and a PDU session or "session" may refer to a PDU connectivity service that provides or enables the exchange of PDUs between the UE 202 and the data network 236.

The UPF 248 may act as an anchor point for intra-RAT and inter-RAT mobility, an external PDU session point of interconnecting to data network 236, and a branching point to support multi-homed PDU sessions. The UPF 248 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 248 may include an uplink classifier to support routing traffic flows to a data network.

The NSSF 250 may select a set of network slice instances serving the UE 202. The NSSF 250 may also determine allowed NSSAI and the mapping to the subscribed S-NSSAIs if needed. The NSSF 250 may also determine the AMF set to be used to serve the UE 202, or a list of candidate AMFs based on a suitable configuration and possibly by querying the NRF 254. The selection of a set of network slice instances for the UE 202 may be triggered by the AMF 244 with which the UE 202 is registered by interacting with the NSSF 250, which may lead to a change of AMF. The NSSF 250 may interact with the AMF 244 via an N22 reference point; and may communicate with another NSSF in a visited network via an N31 reference point (not shown). Additionally, the NSSF 250 may exhibit an Nnssf service-based interface.

The NEF 252 may securely expose services and capabilities provided by 3GPP network functions for the third party, internal exposure/re-exposure, AFs (e.g., AF 260), edge computing or fog computing systems, etc. In such embodiments, the NEF 252 may authenticate, authorize, or throttle the AFs. NEF 252 may also translate information exchanged with the AF 260 and information exchanged with internal network functions. For example, the NEF 252 may translate between an AF-Service-Identifier and an internal 5GC information. NEF 252 may also receive information from other NFs based on the exposed capabilities of other NFs. This information may be stored at the NEF 252 as structured data, or a data storage NF using standardized interfaces. The stored information can then be re-exposed by the NEF 252 to other NFs and AFs, or used for other purposes such as analytics. Additionally, the NEF 252 may exhibit a Nnef service-based interface.

The NRF 254 may support service discovery functions, receive NF discovery requests from NF instances, and provide the information of the discovered NF instances to the NF instances. NRF 254 also maintains information on available NF instances and their supported services. As used herein, the terms "instantiate," "instantiation," and the like may refer to the creation of an instance, and an "instance" may refer to a concrete occurrence of an object, which may occur, for example, during the execution of program code. Additionally, the NRF 254 may exhibit the Nnrf service-based interface.

The PCF 256 may provide policy rules to control plane functions to enforce them, and may also support a unified policy framework to govern network behavior. The PCF 256 may also implement a front end to access subscription information relevant for policy decisions in a UDR of the UDM 258. In addition to communicating with functions over reference points as shown, the PCF 256 exhibits an Npcf service-based interface.

The UDM 258 may handle subscription-related information to support the network entities' handling of communication sessions and may store the subscription data of UE 202. For example, subscription data may be communicated via an N8 reference point between the UDM 258 and the AMF 244. The UDM 258 may include two parts, an application front end, and a UDR. The UDR may store subscription data and policy data for the UDM 258 and the PCF 256, and/or structured data for exposure and application data (including PFDs for application detection, application request information for multiple UEs 202) for the NEF 252. The Nudr service-based interface may be exhibited by the UDR 221 to allow the UDM 258, PCF 256, and NEF 252 to access a particular set of the stored data, as well as to read, update (e.g., add, modify), delete, and subscribe to the notification of relevant data changes in the UDR. The UDM may include a UDM-FE, which is in charge of processing credentials, location management, subscription management, and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 258 may exhibit the Nudm service-based interface.

The AF 260 may provide application influence on traffic routing, provide access to NEF, and interact with the policy framework for policy control.

In some embodiments, the 5GC 240 may enable edge computing by selecting operator/3rd party services to be geographically close to a point that the UE 202 is attached to the network. This may reduce latency and load on the network. To provide edge-computing implementations, the 5GC 240 may select a UPF 248 close to the UE 202 and execute traffic steering from the UPF 248 to data network 236 via the N6 interface. This may be based on the UE subscription data, UE location, and information provided by the AF 260. In this way, the AF 260 may influence UPF (re)selection and traffic routing. Based on operator deployment, when AF 260 is considered to be a trusted entity, the network operator may permit AF 260 to interact directly with relevant NFs. Additionally, the AF 260 may exhibit a Naf service-based interface.

The data network 236 may represent various network operator services, Internet access, or third-party services that may be provided by one or more servers including, for example, application/content server 238.

Figure 3:
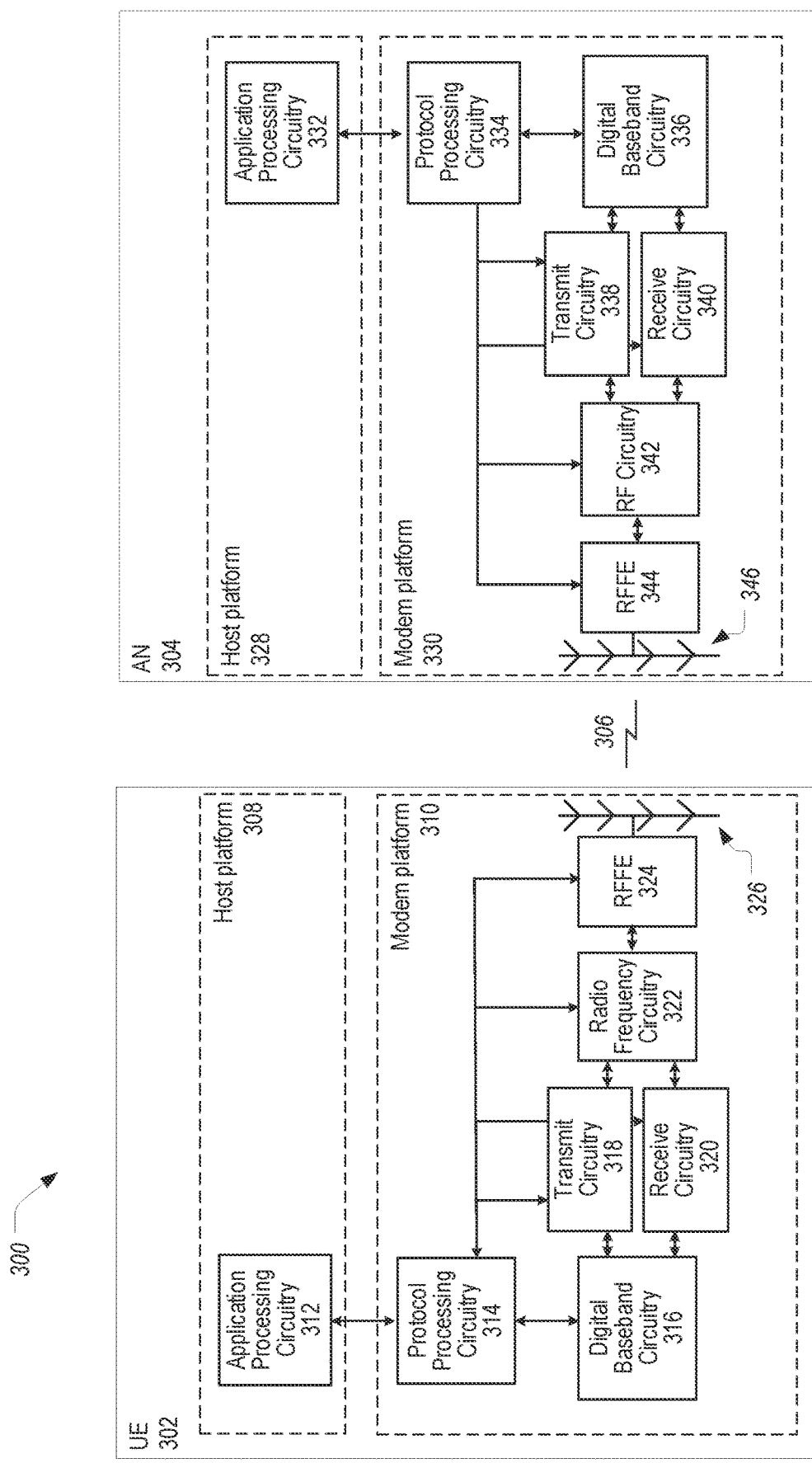

FIG. 3 schematically illustrates a wireless network 300 in accordance with various embodiments. The wireless network 300 may include a UE 302 in wireless communication with AN 304. The UE 302 and AN 304 may be similar to, and substantially interchangeable with, like-named components described elsewhere herein.

The UE 302 may be communicatively coupled with the AN 304 via connection 306. The connection 306 is illustrated as an air interface to enable communicative coupling and can be consistent with cellular communications protocols such as an LTE protocol or a 5G NR protocol operating at mmWave or sub-6 GHz frequencies.

The UE 302 may include a host platform 308 coupled with a modem platform 310. The host platform 308 may include application processing circuitry 312, which may be coupled with protocol processing circuitry 314 of the modem platform 310. The application processing circuitry 312 may run various applications for the UE 302 that source/sink application data. The application processing circuitry 312 may further implement one or more layer operations to transmit/receive application data to/from a data network. These layer operations may include transport (for example UDP) and Internet (for example, IP) operations The protocol processing circuitry 314 may implement one or more layer operations to facilitate transmission or reception of data over the connection 306. The layer operations implemented by the protocol processing circuitry 314 may include, for example, MAC, RLC, PDCP, RRC, and NAS operations.

The modem platform 310 may further include digital baseband circuitry 316 that may implement one or more layer operations that are "below" layer operations performed by the protocol processing circuitry 314 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 310 may further include transmit circuitry 318, receive circuitry 320, RF circuitry 322, and RF front end (RFFE) 324, which may include or connect to one or more antenna panels 326. Briefly, the transmit circuitry 318 may include a digital-to-analog converter, mixer, intermediate frequency (IF) components, etc.; the receive circuitry 320 may include an analog-to-digital converter, mixer, IF components, etc.; the RF circuitry 322 may include a low-noise amplifier, a power amplifier, power tracking components, etc.; RFFE 324 may include filters (for example, surface/bulk acoustic wave filters), switches, antenna tuners, beamforming components (for example, phase-array antenna components), etc. The selection and arrangement of the components of the transmit circuitry 318, receive circuitry 320, RF circuitry 322, RFFE 324, and antenna panels 326 (referred generically as "transmit/receive components") may be specific to details of a specific implementation such as, for example, whether the communication is TDM or FDM, in mmWave or sub-6 GHz frequencies, etc. In some embodiments, the transmit/receive components may be arranged in multiple parallel transmit/receive chains, may be disposed of in the same or different chips/modules, etc.

In some embodiments, the protocol processing circuitry 314 may include one or more instances of control circuitry (not shown) to provide control functions for the transmit/receive components.

A UE reception may be established by and via the antenna panels 326, RFFE 324, RF circuitry 322, receive circuitry 320, digital baseband circuitry 316, and protocol processing circuitry 314. In some embodiments, the antenna panels 326 may receive a transmission from the AN 304 by receive-beamforming signals received by a plurality of antennas/antenna elements of the one or more antenna panels 326.

A UE transmission may be established by and via the protocol processing circuitry 314, digital baseband circuitry 316, transmit circuitry 318, RF circuitry 322, RFFE 324, and antenna panels 326. In some embodiments, the transmit components of the UE 302 may apply a spatial filter to the data to be transmitted to form a transmit beam emitted by the antenna elements of the antenna panels 326.

Similar to the UE 302, the AN 304 may include a host platform 328 coupled with a modem platform 330. The host platform 328 may include application processing circuitry 332 coupled with protocol processing circuitry 334 of the modem platform 330. The modem platform may further include digital baseband circuitry 336, transmit circuitry 338, receive circuitry 340, RF circuitry 342, RFFE circuitry 344, and antenna panels 346. The components of the AN 304 may be similar to and substantially interchangeable with like-named components of the UE 302. In addition to performing data transmission/reception as described above, the components of the AN 304 may perform various logical functions that include, for example, RNC functions such as radio bearer management, uplink and downlink dynamic radio resource management, and data packet scheduling.

Figure 4:
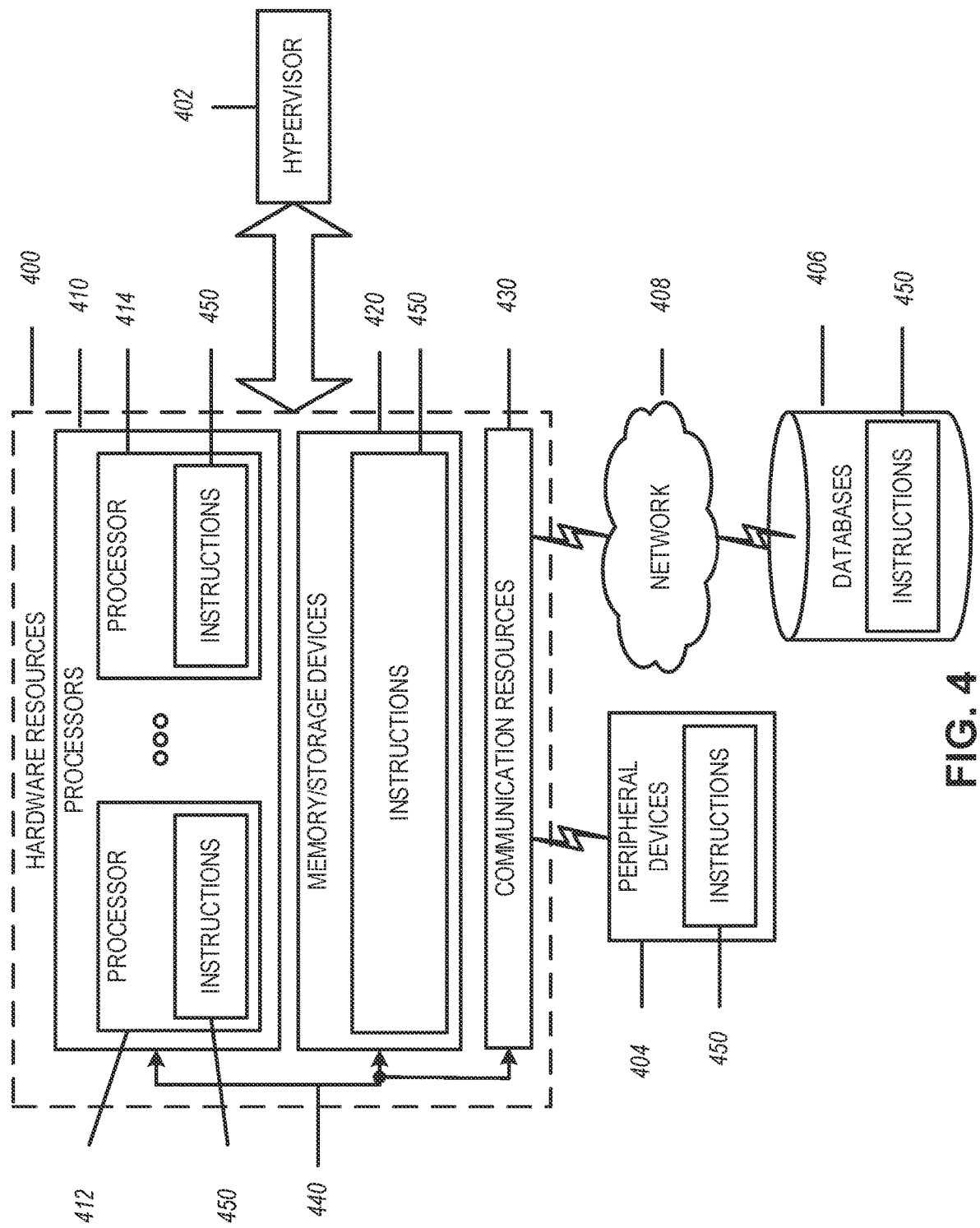

FIG. 4 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 4 shows a diagrammatic representation of hardware resources 400 including one or more processors (or processor cores) 410, one or more memory/storage devices 420, and one or more communication resources 430, each of which may be communicatively coupled via a bus 440 or other interface circuitry. For embodiments where node virtualization (e.g., NFV) is utilized, a hypervisor 402 may be executed to provide an execution environment for one or more network slices/sub-slices to utilize the hardware resources 400.

The processors 410 may include, for example, a processor 412 and a processor 414. The processors 410 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 420 may include a main memory, disk storage, or any suitable combination thereof. The memory/storage devices 420 may include but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 430 may include interconnection or network interface controllers, components, or other suitable devices to communicate with one or more peripheral devices 404 or one or more databases 406 or other network elements via a network 408. For example, the communication resources 430 may include wired communication components (e.g., for coupling via USB, Ethernet, etc.), cellular communication components, NFC components, Bluetooth® (or Bluetooth® Low Energy) components, Wi-Fi® components, and other communication components.

Instructions 450 may comprise software, a program, an application, an applet, an app, or other executable code for causing at least any of the processors 410 to perform any one or more of the methodologies discussed herein. The instructions 450 may reside, completely or partially, within at least one of the processors 410 (e.g., within the processor's cache memory), the memory/storage devices 420, or any suitable combination thereof. Furthermore, any portion of the instructions 450 may be transferred to the hardware resources 400 from any combination of the peripheral devices 404 or the databases 406. Accordingly, the memory of processors 410, the memory/storage devices 420, the peripheral devices 404, and the databases 406 are examples of computer-readable and machine-readable media.

For one or more embodiments, at least one of the components outlined in one or more of the preceding figures may be configured to perform one or more operations, techniques, processes, and/or methods as outlined in the example sections below. For example, baseband circuitry associated with one or more of the preceding figures may be configured to operate in accordance with one or more of the examples set forth below. For another example, circuitry associated with a UE, base station, satellite, network element, etc. as described above in connection with one or more of the preceding figures may be configured to operate in accordance with one or more of the examples set forth below in the example section.

The term "application" may refer to a complete and deployable package, environment to achieve a certain function in an operational environment. The term "AI/ML application" or the like may be an application that contains some artificial intelligence (AI)/machine learning (ML) models and application-level descriptions. In some embodiments, an AI/ML application may be used for configuring or implementing one or more of the disclosed aspects.

The term "machine learning" or "ML" refers to the use of computer systems implementing algorithms and/or statistical models to perform a specific task(s) without using explicit instructions but instead relying on patterns and inferences. ML algorithms build or estimate mathematical model(s) (referred to as "ML models" or the like) based on sample data (referred to as "training data," "model training information," or the like) to make predictions or decisions without being explicitly programmed to perform such tasks.

Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the present disclosure.

The term "machine learning model," "ML model," or the like may also refer to ML methods and concepts used by an ML-assisted solution. An "ML-assisted solution" is a solution that addresses a specific use case using ML algorithms during operation. ML models include supervised learning (e.g., linear regression, k-nearest neighbor (KNN), decision tree algorithms, support machine vectors, Bayesian algorithm, ensemble algorithms, etc.) unsupervised learning (e.g., K-means clustering, principal component analysis (PCA), etc.), reinforcement learning (e.g., Q-learning, multi-armed bandit learning, deep RL, etc.), neural networks, and the like. Depending on the implementation a specific ML model could have many sub-models as components and the ML model may train all sub-models together. Separately trained ML models can also be chained together in an ML pipeline during inference. An "ML pipeline" is a set of functionalities, functions, or functional entities specific for an ML-assisted solution; an ML pipeline may include one or several data sources in a data pipeline, a model training pipeline, a model evaluation pipeline, and an actor. The "actor" is an entity that hosts an ML-assisted solution using the output of the ML model inference). The term "ML training host" refers to an entity, such as a network function, that hosts the training of the model. The term "ML inference host" refers to an entity, such as a network function, that hosts the model during inference mode (which includes both the model execution as well as any online learning if applicable). The ML-host informs the actor about the output of the ML algorithm, and the actor decides for an action (an "action" is performed by an actor as a result of the output of an ML-assisted solution). The term "model inference information" refers to information used as an input to the ML model for determining inference(s); the data used to train an ML model and the data used to determine inferences may overlap, however, "training data" and "inference data" refer to different concepts.

As used herein, the term "non-terrestrial networks" (or NTNs) indicates networks, or segments of networks, using an airborne or space-borne vehicle configured as a transmission equipment relay node or a base station. In this regard, a non-terrestrial network may use RF resources onboard a satellite (or unmanned aircraft system (UAS) platform).

As used herein, the term "NTN-gateway" (or "NTN Gateway" or "gateway" or "sat-gateway") indicates that an earth station or gateway is located at the surface of the Earth, and provides sufficient RF power and RF sensitivity for accessing to the satellite. In some aspects, NTN Gateway is a transport network layer (TNL) node.

As used herein, the term "regenerative payload" indicates a payload that transforms and amplifies an uplink RF signal before transmitting it on the downlink. The transformation of the signal refers to digital processing that may include demodulation, decoding, re-encoding, re-modulation, and/or filtering.

As used herein, the term "round trip delay" indicates the time required for a signal to travel from a terminal to the sat-gateway or from the sat-gateway to the terminal and back. This delay may be used in connection with web-based applications.

As used herein, the term "satellite" (or satellite node) indicates a space-borne vehicle embarking a bent pipe payload or a regenerative payload telecommunication transmitter, placed into Low-Earth Orbit (LEO), Medium-Earth Orbit (MEO), or Geostationary Earth Orbit (GEO). As used herein, the term "satellite beam" indicates a beam generated by an antenna onboard a satellite. As used herein, the term "service link" indicates a radio link between a satellite and a UE.

As used herein, the term "transparent payload" indicates a payload that changes the frequency carrier of the uplink RF signal, filters, and amplifies it before transmitting it on the downlink.

In some embodiments, a non-terrestrial network refers to a network, or segment of networks using RF resources onboard a satellite (or UAS platform).

Figure 5:
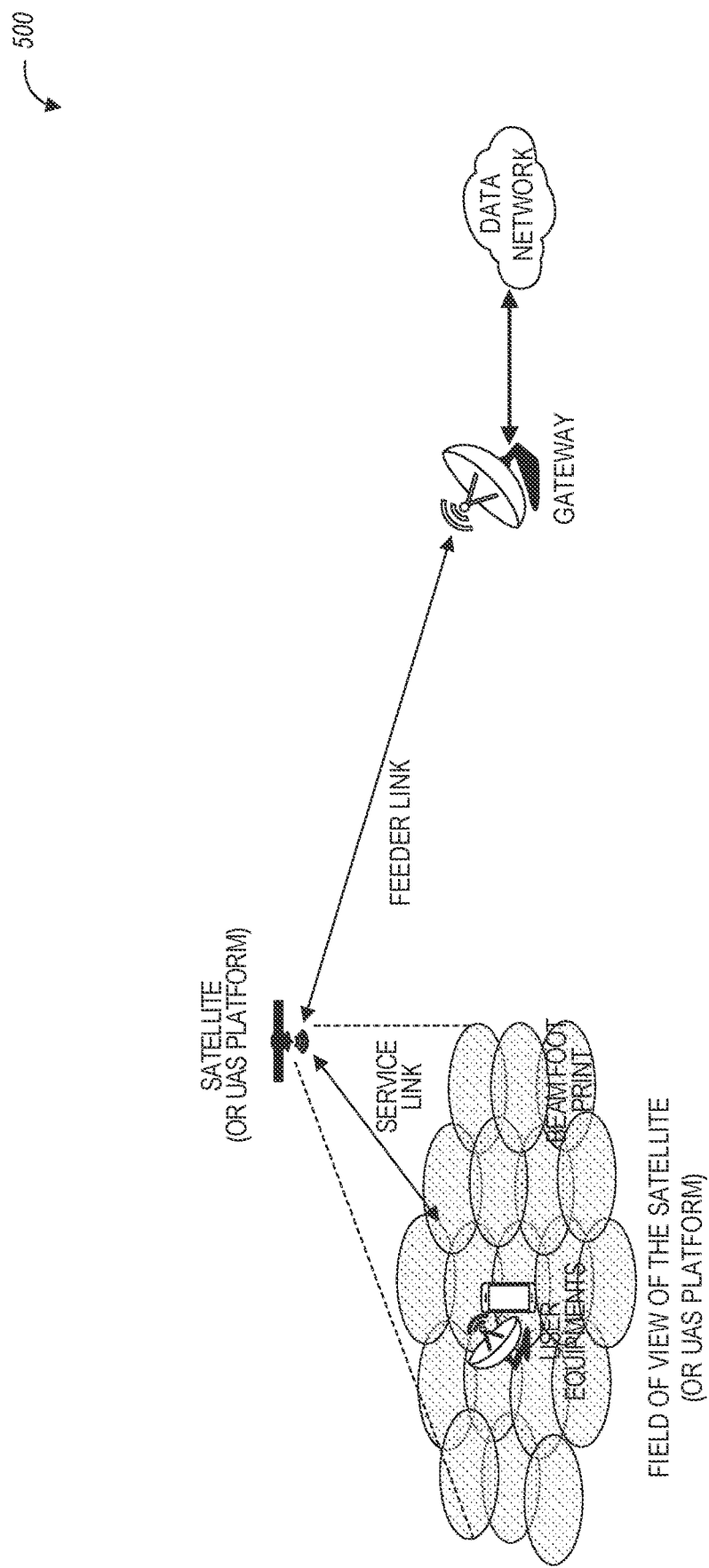
FIG. 5 illustrates a non-terrestrial network using a non-transparent payload, according to some embodiments.
Figure 6:
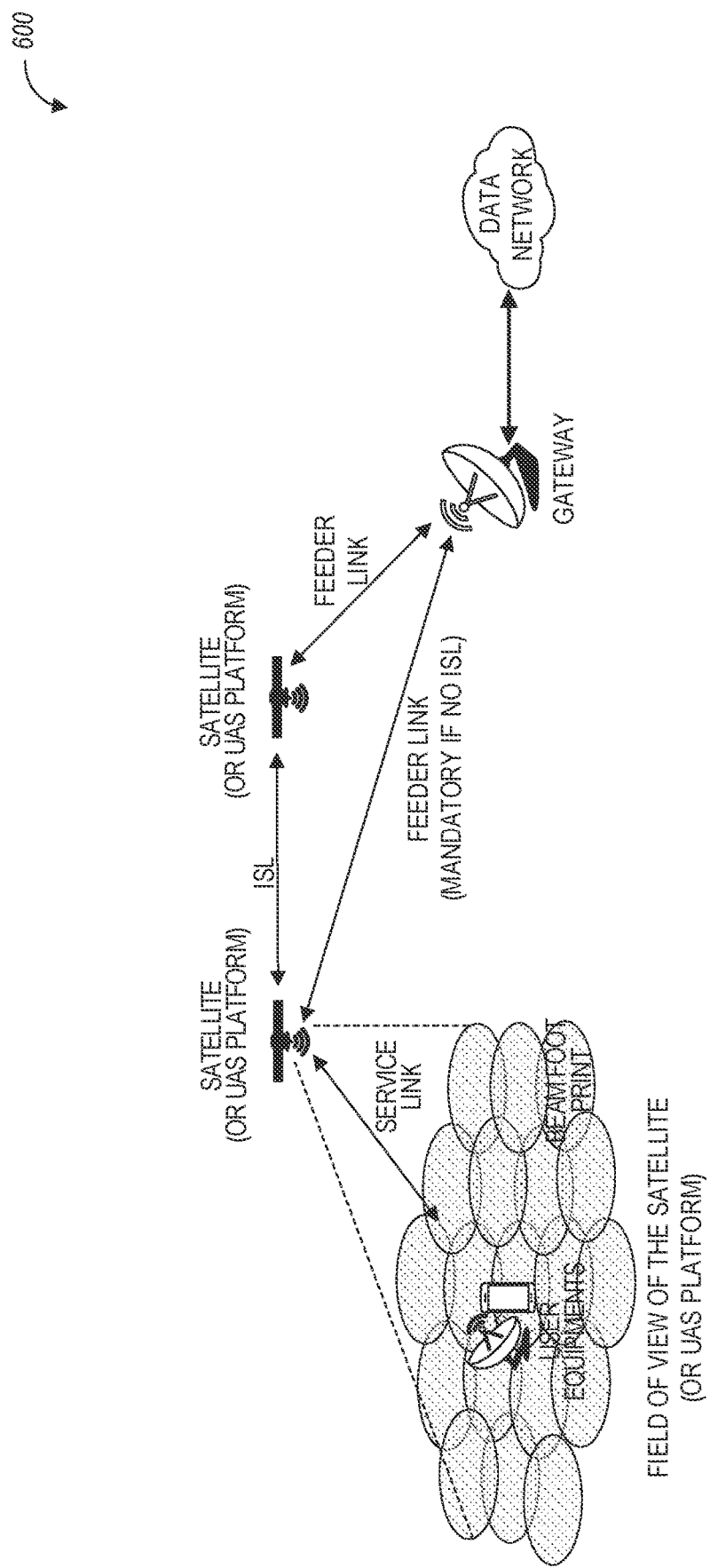
FIG. 6 illustrates a non-terrestrial network using a regenerative payload, according to some embodiments.

FIG. 5 and FIG. 6 illustrate example scenarios of a non-terrestrial network providing access to a user equipment. More specifically, FIG. 5 illustrates a non-terrestrial network 500 using a non-transparent payload, according to some embodiments. FIG. 6 illustrates a non-terrestrial network 600 using a regenerative payload, according to some embodiments.

In some embodiments, the disclosed NTNs may include one or more of the following elements: (a) at least one gateway connecting the NTN to a data network; (b) a GEO satellite fed by at least one gateway deployed across the satellite targeted coverage; (c) a non-GEO satellite served by one or multiple gateways at any given time; (d) a feeder link or radio link between a gateway (e.g., a sat-gateway) and the satellite (or UAS platform); (e) a service link or a radio link between the UE and the satellite (or UAS platform); (f) a satellite (or UAS platform) configured with a transparent or a regenerative payload (the satellite may generate multiple beams over a service area bounded by its field of view, where the footprints of the beams may be of elliptic shape); (g) a transparent payload; (h) a regenerative payload (e.g., RF filtering, frequency conversion and amplification as well as demodulation/decoding, switch and/or routing, coding/modulation may be performed, which may be equivalent to having all or part of base station functionalities on board the satellite); (h) inter-satellite links (ISL) may be used optionally in case of a swarm of satellites (ISL may operate in an RF frequency or in optical bands); and (i) UEs may be served by the satellite within a targeted service area.

Figure 7:
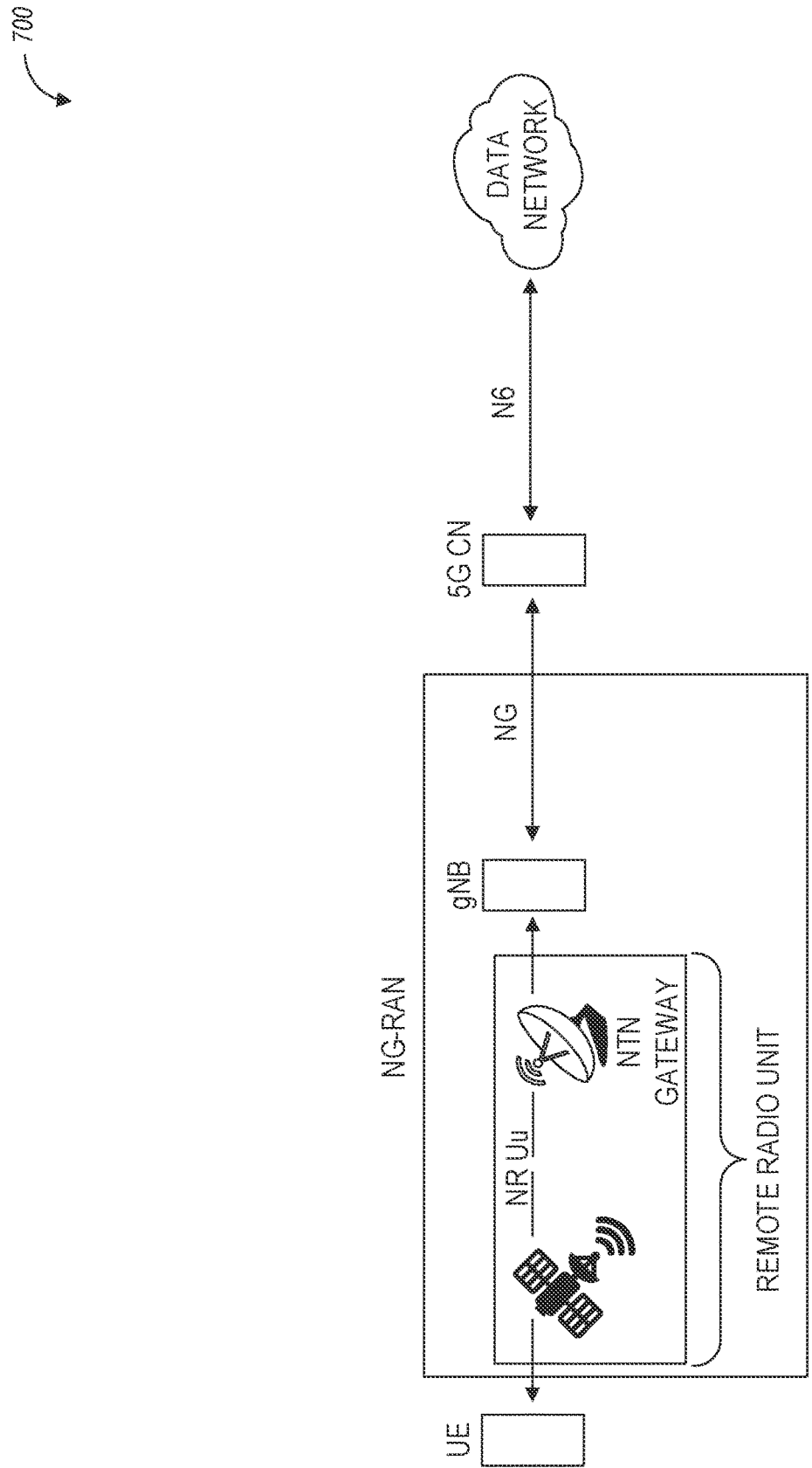
FIG. 7 illustrates a non-terrestrial network including a networking-RAN architecture with a transparent satellite, according to some embodiments.

FIG. 7 illustrates a non-terrestrial network 700 including a networking-RAN architecture with a transparent satellite, according to some embodiments.

In some embodiments, a satellite payload may implement frequency conversion and an RF amplifier in both the uplink and the downlink. In this regard, the satellite repeats the NR-Uu radio interface from a feeder link (between the gateway and the satellite) to a service link (between the satellite and the UE) and vice versa.

In some embodiments, the satellite radio interface (SRI) on the feeder link is the NR-Uu (e.g., the satellite does not terminate NR-Uu), and the gateway supports functionality for forwarding the signal received via the NR-Uu interface. In some embodiments and as illustrated in FIGS. 7-9, transparent satellites may be connected to the same gNB on the ground.

Figure 8:
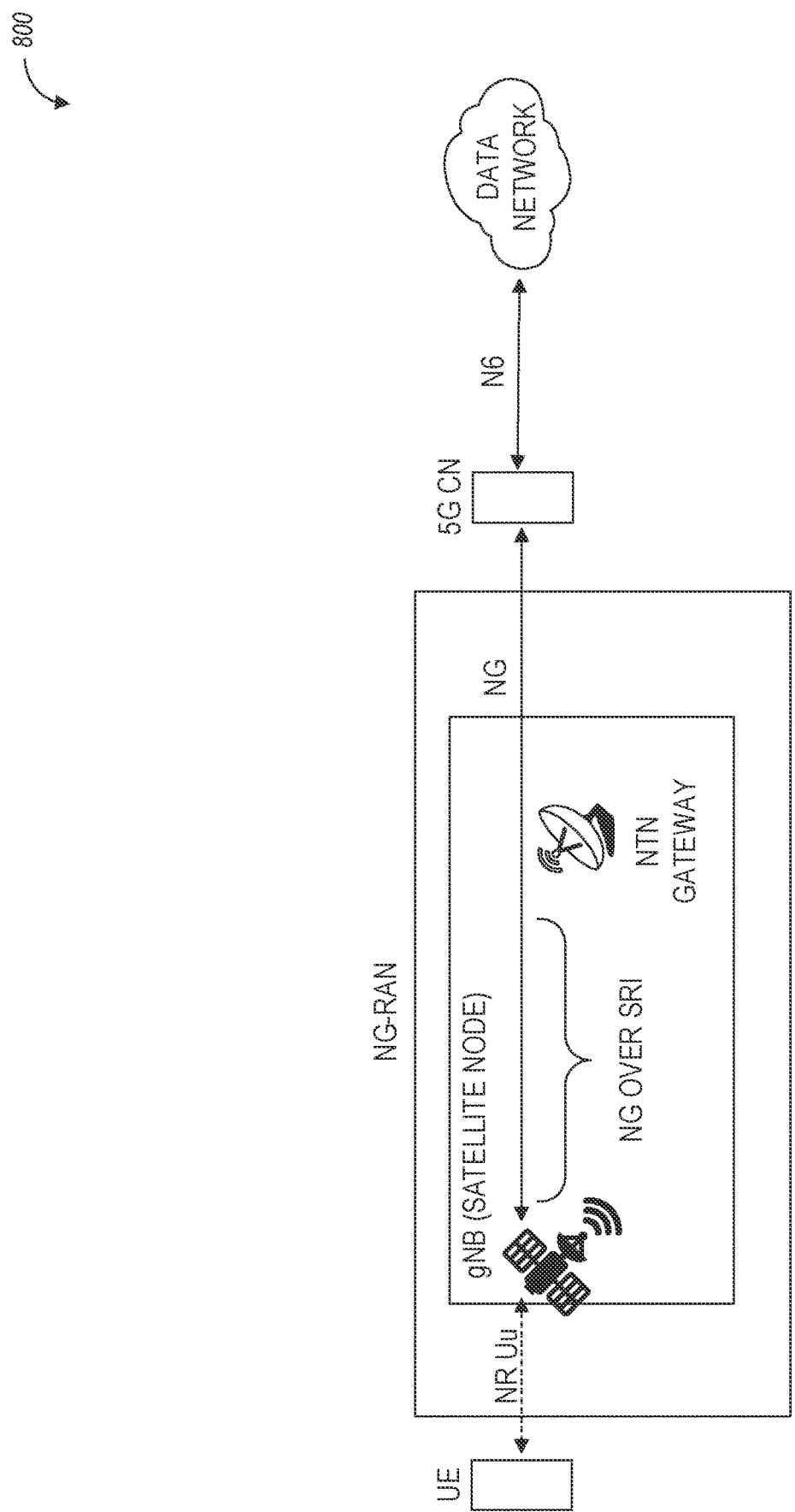
FIG. 8 illustrates a non-terrestrial network including a regenerative satellite without inter-satellite links (ISL), according to some embodiments.

FIG. 8 illustrates a non-terrestrial network 800 including a regenerative satellite without inter-satellite links (ISL), according to some embodiments.

In some embodiments, a satellite payload may be configured for regeneration of the signals received from Earth, where the NR-Uu interface may be used on the service link between the UE and the satellite, and a satellite radio interface (SRI) may be used on the feeder link between the gateway and the satellite. In some embodiments, the SRI may be configured as a transport link between the gateway and the satellite. In some embodiments, the satellite payload may be associated with ISL between multiple satellites. In some aspects, ISL may be configured as a radio interface or an optical interface (e.g., 3GPP or non-3GPP defined). In some aspects, the gateway may be configured as a transport network layer node supporting one or more transport protocols.

Figure 9:
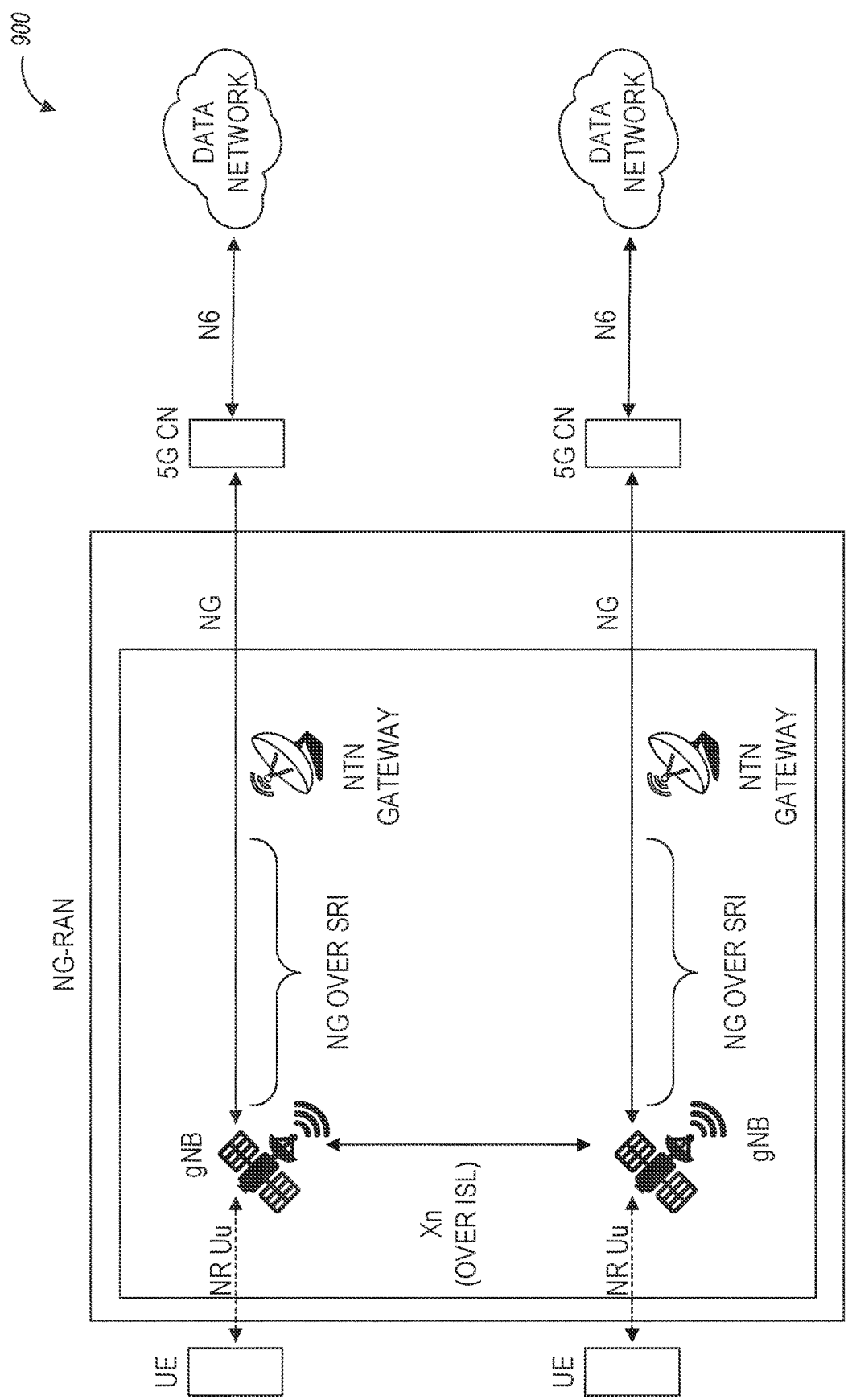
FIG. 9 illustrates a non-terrestrial network including a regenerative satellite with ISL, according to some embodiments.

FIG. 9 illustrates a non-terrestrial network 900 including a regenerative satellite with ISL, according to some embodiments. More specifically, FIG. 9 illustrates that a UE served by a gNB onboard a satellite could access a 5G core network via the ISL. In some aspects, the gNB may be configured onboard different satellites and may be connected to the same 5G core network on the ground. In some embodiments when the satellite hosts more than one gNB, the same SRI may be used for transporting NG interface instances.

In some embodiments, the disclosed 5G communication systems may be configured to support non-terrestrial access (e.g. satellites, high-altitude platforms, etc.). In the case of Low Earth Orbit (LEO) satellites, the satellite beam projected on the Earth surface can be either earth-fixed (by using beam steering techniques) or can be earth-moving.

In some aspects, an example target for the (I)IoT use cases is to achieve latency of positioning in the order of 10 ms which is significantly faster than existing RAT-dependent LTE and NR Positioning protocols that are currently designed assuming positioning delays in the order of seconds.

The present disclosure provides techniques for supporting low latency for NR RAT-dependent positioning protocols. More specifically, the disclosed techniques provide enhancements to support low-latency downlink time difference of arrival (DL-TDOA), downlink angle of departure (DL-AoD), uplink TDOA (UL-TDOA), uplink angle of arrival (UL AoA), and Multi-round-trip time (multi-RTT) positioning solutions for NR system including new procedures for NR positioning.

Figure 10:
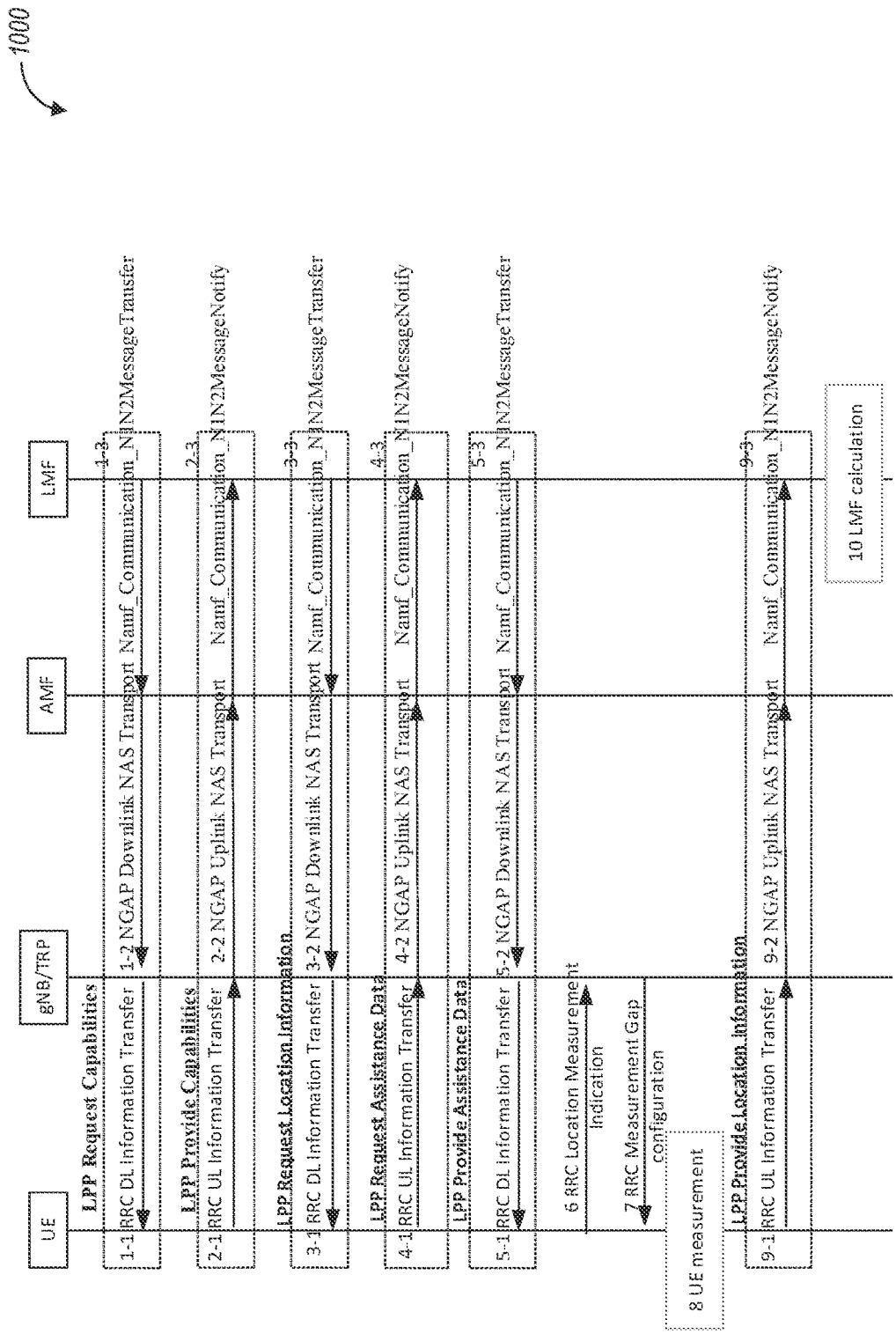
FIG. 10 illustrates an example messaging between the LMF, the gNBs, and the UE to perform a DL-TDOA/DL-AOD positioning procedure, according to some embodiments.
Figure 11:
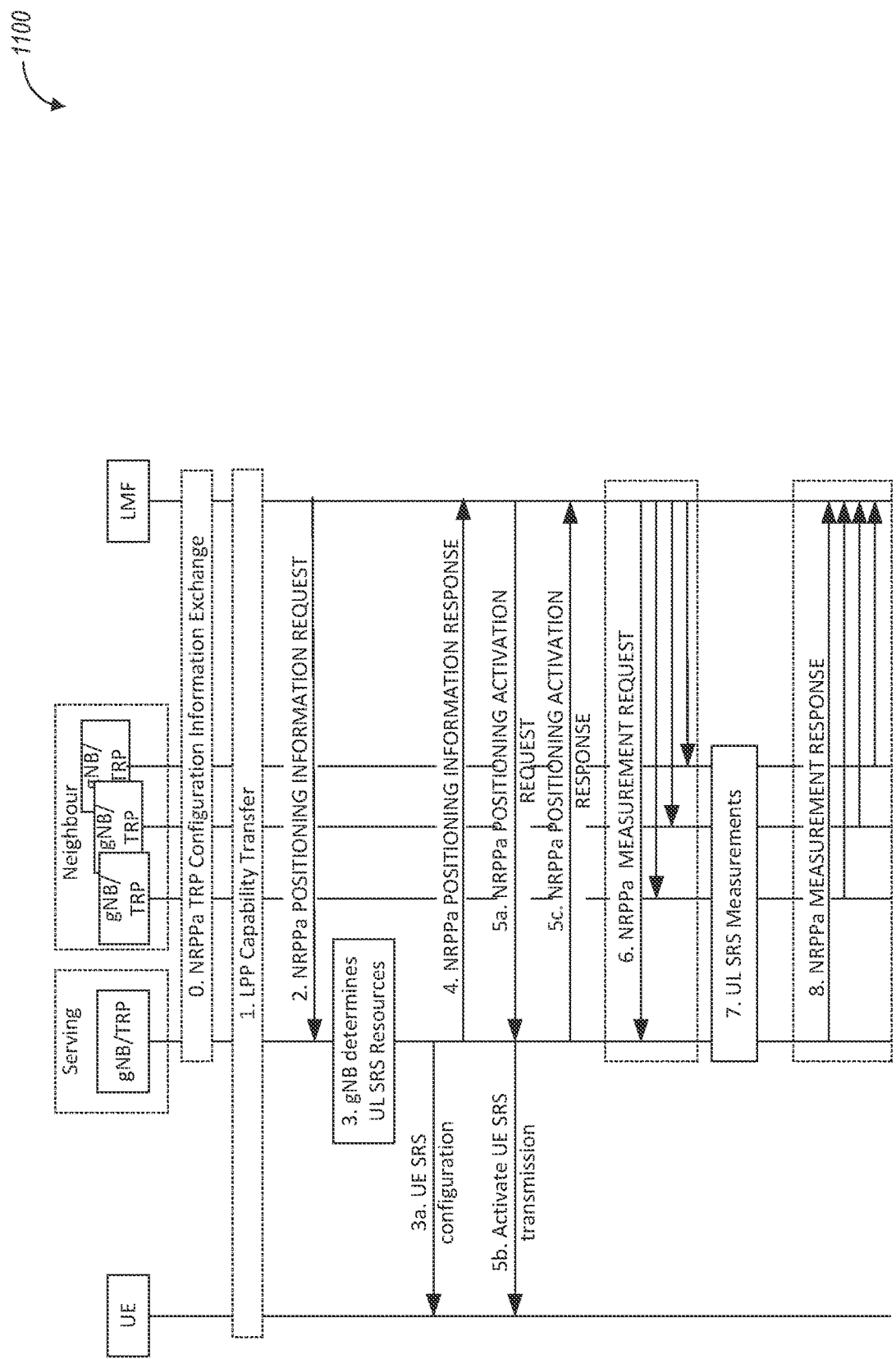
FIG. 11 illustrates an example messaging between the LMF, the gNBs, and the UE to perform a UL-TDOA NR positioning procedure, according to some embodiments.
Figure 12:
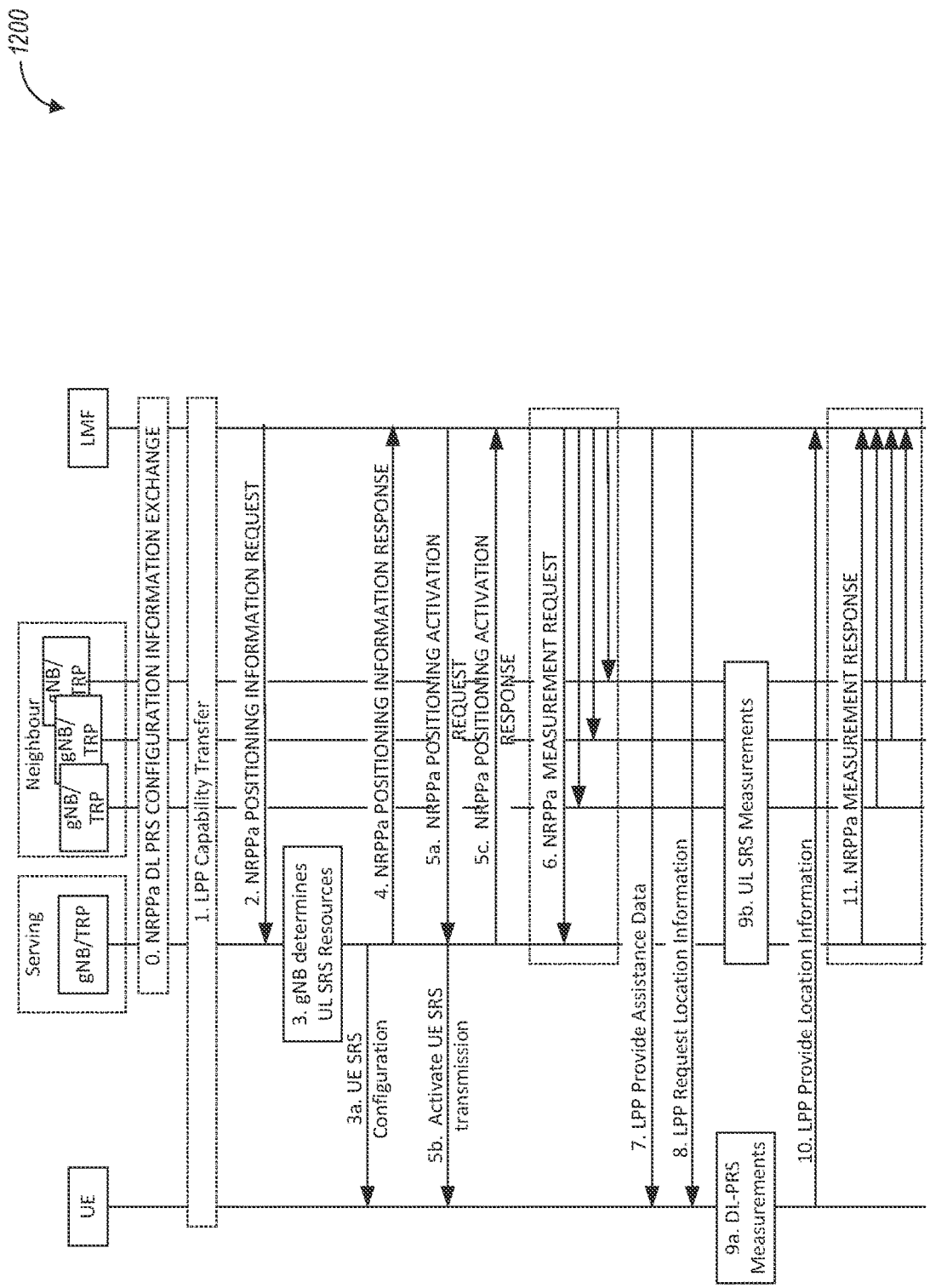
FIG. 12 illustrates an example messaging between the LMF, the gNBs, and the UE to perform an LMF-initiated Location Information Transfer Procedure for Multi-RTT, according to some embodiments.
Figure 13:
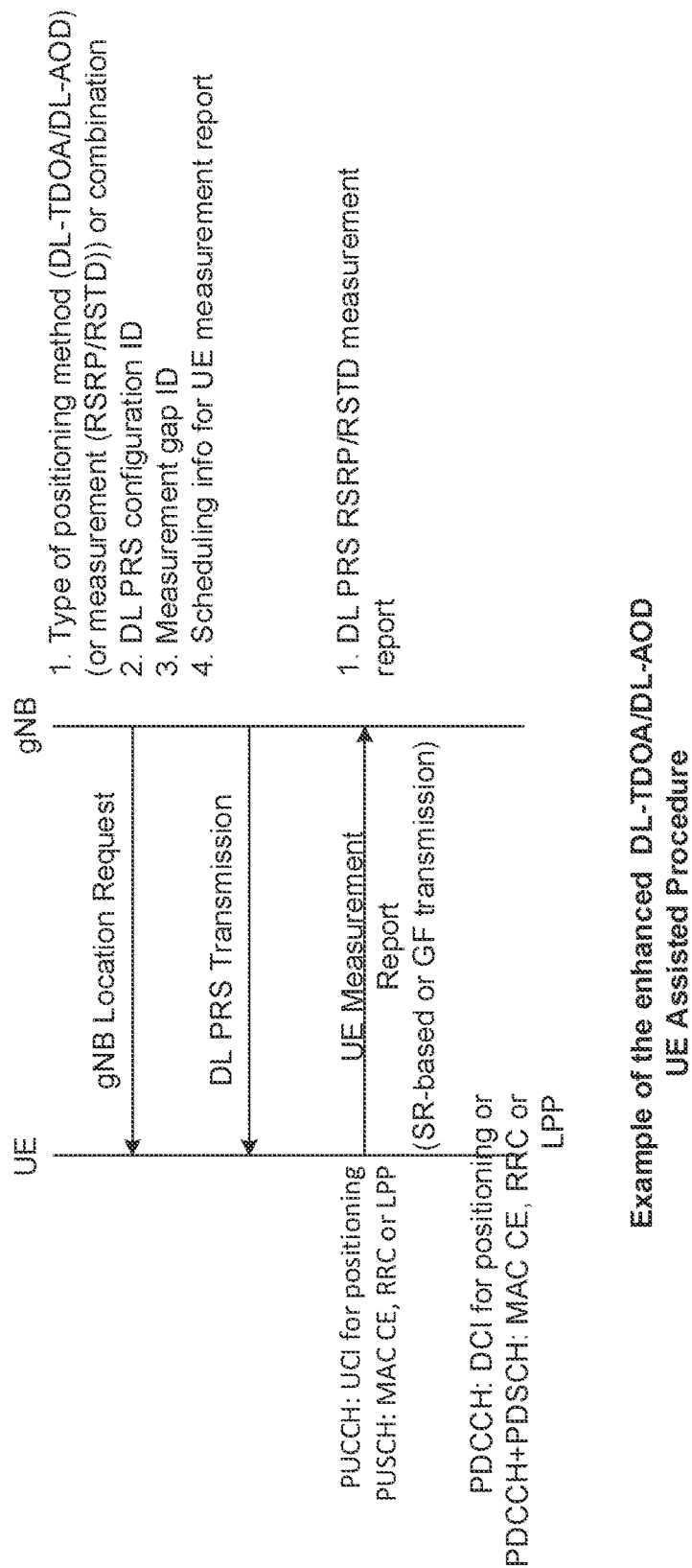
FIG. 13, FIG. 14, FIG. 15, FIG. 16, FIG. 17, and FIG. 18 illustrate example low latency NR positioning procedures, according to some embodiments.
Figure 14:
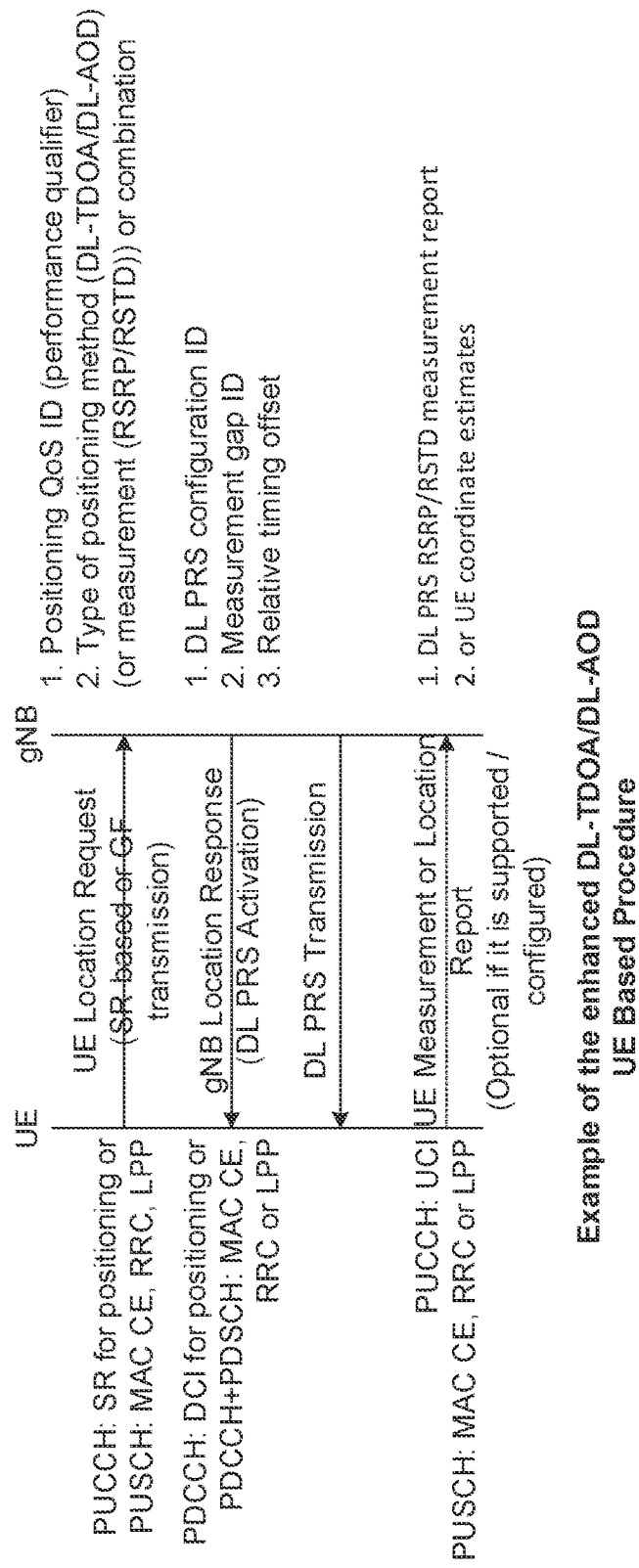
Figure 15:
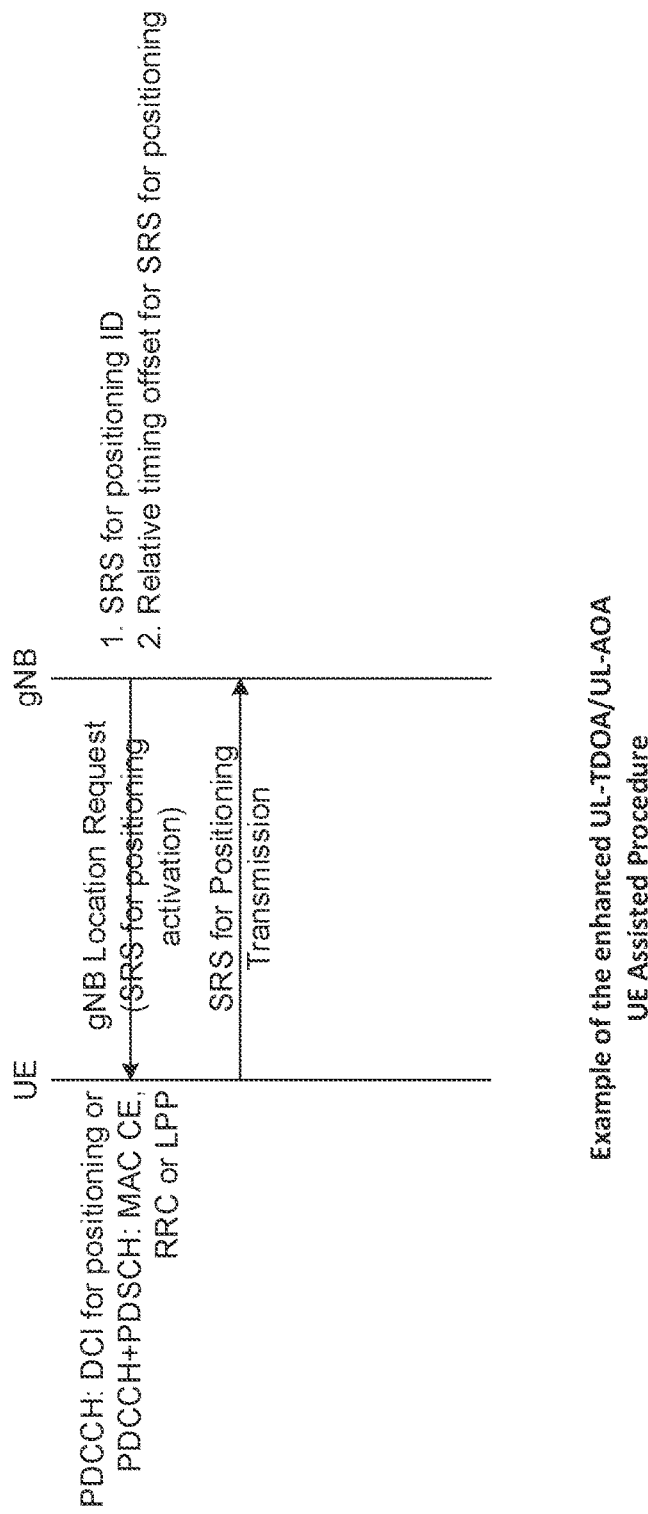
Figure 16:
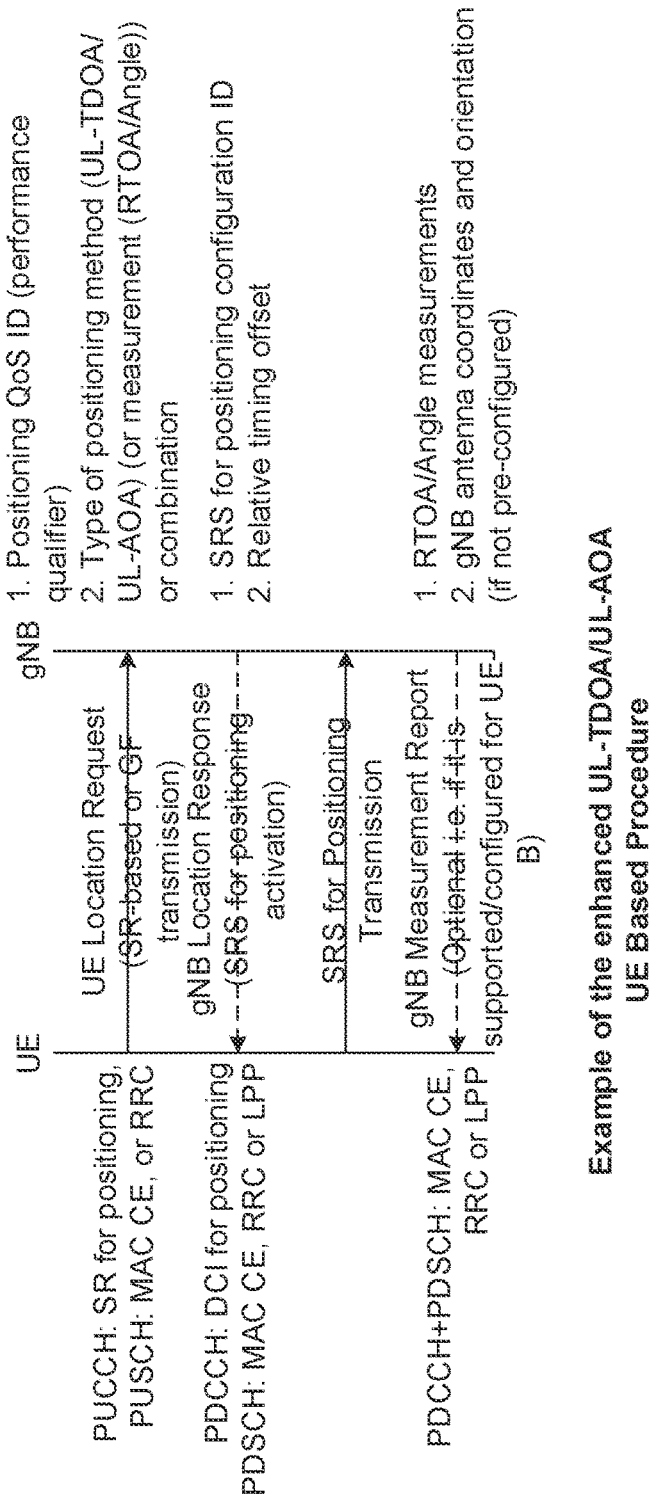
Figure 17:
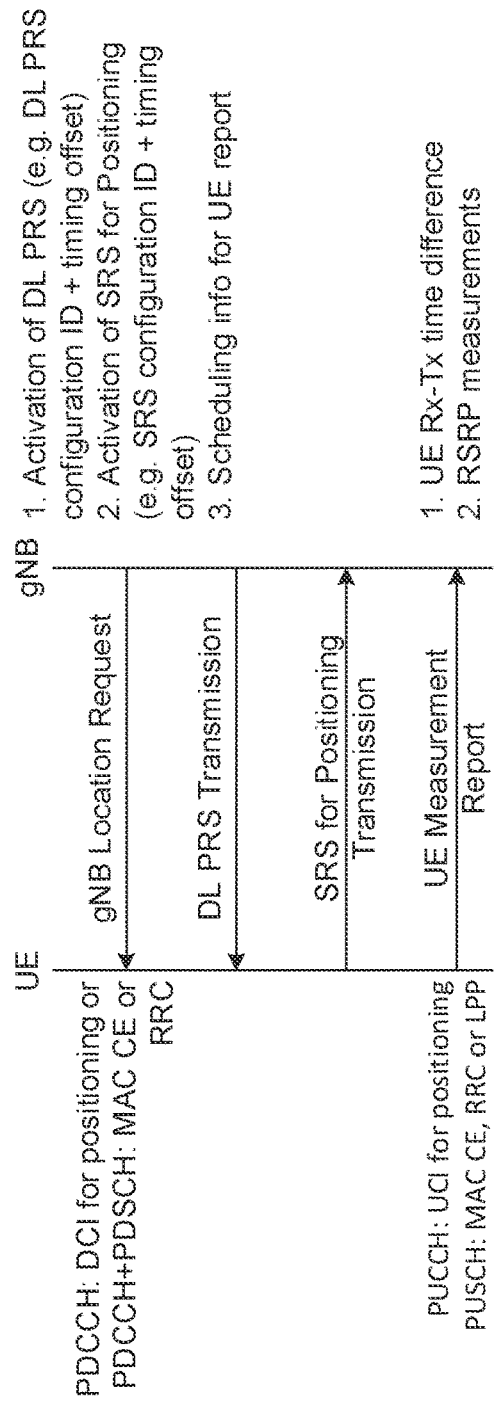
Figure 18:
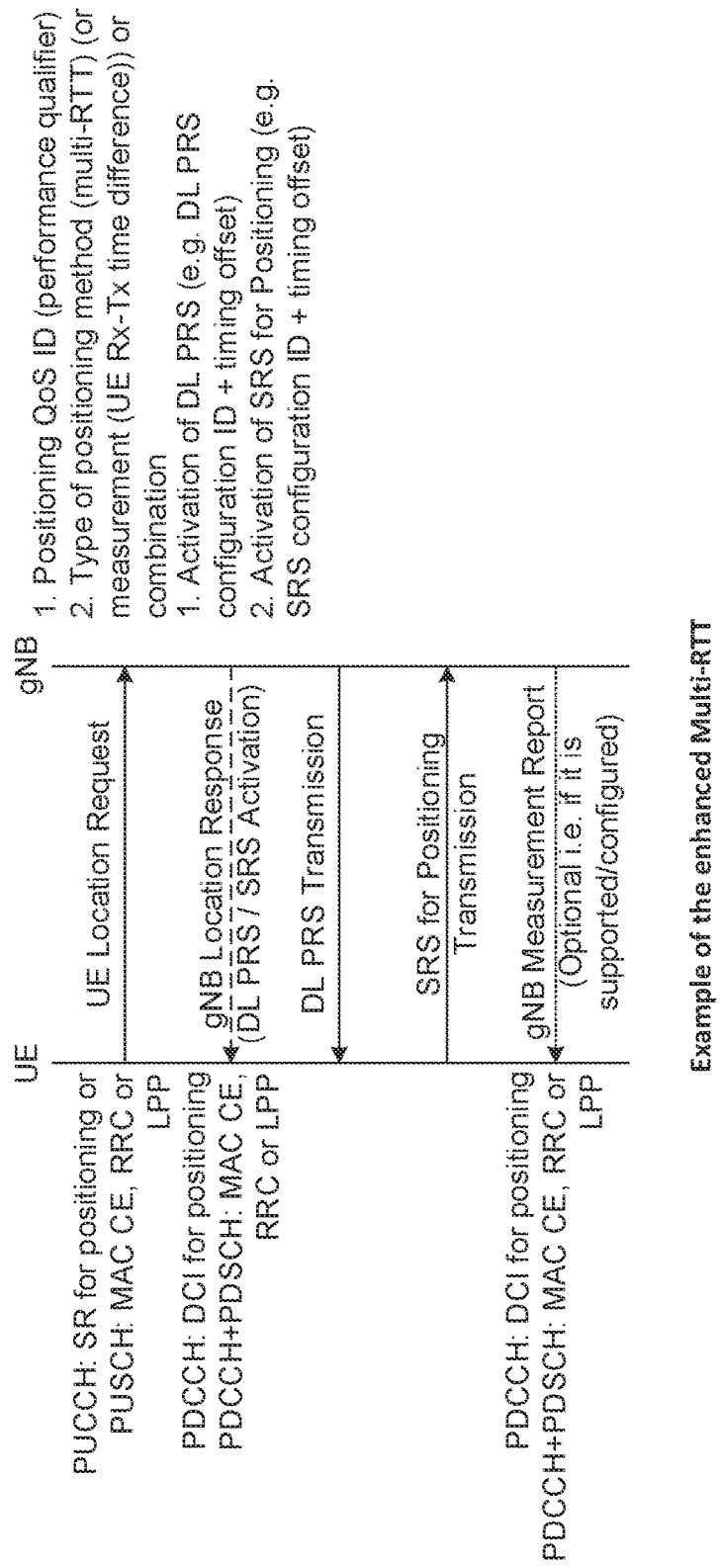

FIGS. 10-12 illustrates RAN procedures for NR positioning. FIG. 10 illustrates diagram 1000 of an example messaging between the LMF, the gNBs, and the UE to perform a DL-TDOA/DL-AOD positioning procedure, according to some embodiments.

FIG. 11 illustrates diagram 1100 of an example messaging between the LMF, the gNBs, and the UE to perform a UL-TDOA NR positioning procedure, according to some embodiments.

FIG. 12 illustrates diagram 1200 of an example messaging between the LMF, the gNBs, and the UE to perform an LMF-initiated Location Information Transfer Procedure for Multi-RTT, according to some embodiments.

Latency Analysis of NR Positioning Solutions and Reference System Configuration

The following techniques may be used to perform an analysis of the physical layer latency for NR positioning solutions. In some aspects, Physical (PHY) layer latency start and end times may be defined as indicated in Table 1 below;

TABLE 1

| Method | Start | End |
| --- | --- | --- |
| UE assisted DL-only & DL-ECID & Multi-RTT | Transmission of the PDSCH from the gNB carrying the LPP Request Location Information message | Successful decoding of the PUSCH carrying the LPP Provide Location Information message |
| UL-only method & UL ECID & Multi-RTT | Reception by the gNB of the NRPPa measurement request message | The transmission by the gNB of the NRPPa measurement response message |
| UE-based | Transmission of the PDSCH from the gNB carrying the LPP Request Location Information if applicable, otherwise, Alt. 1: transmission of the PUSCH carrying the MG Request from the UE. Alt. 2: Transmission of the PDSCH from the gNB carrying the LPP message containing the assistance data Alt. 3: Start of the Reception of DL PRS Note: Suggest to downselect this at the next meeting. Note: The high layers latency components may be subject to adjustment for different alternatives. | Successful decoding of the PUSCH at gNB carrying the LPP Provide Location Information message if applicable, otherwise Calculation of Location Estimate at the UE |

In some aspects, the following reference system configurations may be used in connection with NR positioning latency analysis:

(a) Spectrum—FDD/FR1;

(b) SCS—30 kHz;

(c) PDCCH: Monitoring occasions—7 per slot [1, 0, 1, 0, 1, 0, 1, 0, 1, 0, 1, 0, 1, 0]; and Duration—1 symbol;

(d) PDSCH: One symbol overlap with PDCCH; Duration—2, 4, 7 symbols (Type B mapping); and Slot boundary is respected (i.e. transmission does not cross-slot boundary);

(e) PUSCH: Any symbol, subject to slot boundary constraint (i.e. transmission does not cross-slot boundary); and Duration—2, 4, 7 symbols (Type B mapping w/ front-loaded DMRS);

(f) PUCCH: 7 occasions per slot [1, 0, 1, 0, 1, 0, 1, 0, 1, 0, 1, 0, 1, 0] for SR and HARQ feedback; Duration—1 symbol; and No HARQ—initial transmission is successful;

(g) SRS for positioning: Single resource, 1 symbol duration; and Periodicity—each slot;

(h) DL PRS: 3 resources/4 symbols per resource/12 Comb-4 symbols per period; and Periodicity—20 ms;

(i) UE DL PRS processing capability—N=0.5 ms (~12 symbols @ 30 kHz), T=8 ms: UE capability for Tproc,1 Tproc,2; and Capability #2 (for low latency);

Measurement gap: Type 1: BWP switching=2 slots @ 30 kHz; MGL=5.5 ms, MGRP=20 ms; 2 BWP switching times per occasion (from and to active DL BWP)+DL PRS duration=>5 slots; Nsample=4 (RAN4 core measurements requirements); and UE is expected to perform measurements on DL PRS resource 4 times (i.e., across 4 periods).

Latency Analysis of the Rel. 16 DL-TDOA/DL-AoD

The latency analysis for the Rel. 16 DL-TDOA or DL-AoD positioning methods is summarized in Table 2 below and is based on procedure and signaling shown in FIG. 10.

TABLE 2

Case 1, InF, FR1, R.16 DL-TDOA/DL-AoD
Source NW/Destination NW - (RAN procedure is transparent to source/destination)
Positioning technique: DL-TDOA/DL-AoD, type DL
only, mode: UE-A, Initial and Final RRC States: CONNECTED

| Latency Components | Value Range, ms | Description of Latency Component |
|---|---|---|
| Start trigger | | |
| Step 1. Location Request | 24.25 symbols 0.8661 ms | Value is provided for L1 components only |
| 1A: PDCCH + PDSCH preparation time | 4.75 symbols 0.1696 ms | Not specified. For analysis, the assumption from [38.824] is used: UE's N2/2 + X for scheduling the initial PDSCH. X = 2/4/8 symbols for SCS = 30/60/120 kHz, respectively. N2 = 5.5 symbols@30 kHz SCS for UE capability 2 5.5/2 + 2 = 4.75 |
| 1B: PDCCH + PDSCH alignment time | 7 symbols 0.25 ms | Depends on the configuration of PDCCH monitoring occasions, PDSCH transmission duration, time to slot boundary, and TDD configuration Worst case: 7 symbols@30 kHz for selected reference system configuration |
| 1C: PDCCH + PDSCH transmission time | 7 symbols 0.25 ms | Depends on PDCCH + PDSCH transmission duration 7 symbols@30 kHz for selected reference system configuration |
| 1D: PDCCH + PDSCH processing time | 5.5 symbols 0.1964 ms | Specified as UE PDSCH processing Tproc,1. Tproc,1 = N1 + d11 + d2, d11 = 1 symbol, d2 = 0, N1 = 4.5 for 30 kHz SCS and UE capability 2 5.5 symbols@30 kHz for selected reference configuration |
| 1E: L2/L3: UE LPP processing | ~84 symbols ~3 ms | Not specified. The following number is assumed - 3 ms |
| Step 2. Assistance Information Request | 39.75 symbols 1.4196 ms | Value is provided for L1 components only |
| 2A: SR preparation time | 0 symbols 0 ms | 0 ms is assumed since SR can be prepared in advance based on UE implementation |
| 2B: SR alignment time | 2 symbols 0.0714 ms | Depends on the configuration of SR monitoring occasions, TDD configuration Worst case: 2 symbols@30 kHz for selected reference system configuration |
| 2C: SR transmission time | 1 symbol 0.0357 ms | 1 symbol for selected reference system configuration |
| 2D: SR processing time | 4.5 symbols 0.1607 ms | Not specified. For analysis, the assumption from [38.824] is used. For SR-based PUSCH, gNB's processing time for SR is UE's N1. |
| 2E: PDCCH preparation time | 2.25 symbols 0.0804 ms | Not specified. For analysis, the assumptions from the [38.824] are used to derive PDCCH preparation time equal to N1/2: gNB's PUSCH-to-PDCCH processing time (PDCCH alignment has to be included separately) is UE's N1 + X; gNB's decoding time for the last PUSCH is UE's N1/2 + X; X = 2/4/8 symbols for SCS = 30/60/120 KHz, respectively. |
| 2F: PDCCH alignment time | 2 symbols 0.0714 ms | Depends on the configuration of PDCCH monitoring occasions and TDD configuration |
| 2G: PDCCH transmission time | 1 symbol 0.0357 ms | 1 symbol for selected reference system configuration |
| 2H: PUSCH preparation time | 6.5 symbols 0.2321 ms | Specified as UE PUSCH preparation time Tproc,2 = N2 + d21 + d2 (if no BWP switch) N2 = 5.5@30 kHz, d21 = 1, d2 = 0. |
| 2I: PUSCH alignment time | 7 symbols 0.2500 ms | Worst case: 7 symbols for a given reference configuration |
| 2J: PUSCH transmission time | 7 symbols 0.2500 ms | 7 symbols for selected reference system configuration |

TABLE 2-continued

Case 1, InF, FR1, R.16 DL-TDOA/DL-AoD
Source NW/Destination NW - (RAN procedure is transparent to source/destination)
Positioning technique: DL-TDOA/DL-AoD, type DL
only, mode: UE-A, Initial and Final RRC States: CONNECTED

| Latency Components | Value Range, ms | Description of Latency Component |
|---|---|---|
| 2K: PUSCH processing time | 6.5 symbols 0.2321 ms | Not specified. For analysis, the assumption from the [38.824] is used. gNB's decoding time for the last PUSCH is UE's N1/2 + X; X = 2/4/8 symbols for SCS = 30/60/120 KHz, respectively. |
| 2L: L2/L3: gNB LPP processing time | [~84 symbols ~3 ms] | Not specified. 3 ms are assumed in this analysis Note: Assistance information can be provided in advance. If so Step 2 can be excluded from consideration |
| Step 3. Assistance Information TX & RX | 24,25 symbols 0,8661 ms | Value is provided for L1 components only |
| 3A: PDCCH + PDSCH preparation time | 4.75 symbols 0.1696 ms | Same as for 1A |
| 3B: PDCCH + PDSCH alignment time | 7 symbols 0.2500 ms | Same as for 1B |
| 3C: PDCCH + PDSCH transmission time | 7 symbols 0.2500 ms | Same as for 1C |
| 3D: PDCCH + PDSCH processing time | 5.5 symbols 0.1964 ms | Same as for 1D |
| 3E: L2/L3 component: UE LPP processing | ~84 symbols 3 ms | Not defined. 3 ms are assumed |
| Step 4. Measurement Gap Request | 39.75 symbols 1.4196 ms | Value is provided for L1 components only |
| 4A: SR preparation time | 0 symbols 0 ms | Same as for 2A |
| 4B: SR alignment time | 2 symbols 0.0714 ms | Same as for 2B |
| 4C: SR transmission time | 1 symbol 0.0357 ms | Same as for 2C |
| 4D: SR processing time | 4.5 symbols 0.1607 ms | Same as for 2D |
| 4E: PDCCH preparation time | 2.25 symbols 0.0804 ms | Same as for 2E |
| 4F: PDCCH alignment time | 2 symbols 0.0714 ms | Same as for 2F |
| 4G: PDCCH transmission time | 1 symbol 0.0357 ms | Same as for 2G |
| 4H: PUSCH preparation time | 6.5 symbols 0.2321 ms | Same as for 2H |
| 4I: PUSCH alignment time | 7 symbols 0.0357 ms | Same as for 2I |
| 4J: PUSCH transmission time | 7 symbols 0.0357 ms | Same as for 2J |
| 4K: PUSCH processing time | 6.5 symbols 0.2321 ms | Same as for 2K |
| 4L: L2/L3 component: gNB MAC CE processing delay | ~28 symbols ~1 ms | Not defined. 1 ms is assumed |
| Step 5. Measurement Gap Configuration | 24.25 symbols 0.8661 ms | Value is provided for L1 components only |
| 5A: PDCCH + PDSCH preparation time | 4.75 symbols 0.1696 ms | Same as for 1A |
| 5B: PDCCH + PDSCH alignment time | 7 symbols 0.7500 ms | Same as for 1B |
| 5C: PDCCH + PDSCH transmission time | 7 symbols 0.7500 ms | Same as for 1C |
| 5D: PDCCH + PDSCH processing time | 5.5 symbols 0.1964 ms | Same as for 1D |
| 5E: L2/L3 component: UE RRC processing delay | ~280 symbols 10 ms | Specified - 10 ms |
| Step 6. DL PRS Processing | 88,5 ms | Value is provided for L1 components only |
| DL PRS alignment time | 560 symbols 20 ms | Depends on DL PRS periodicity settings Worst case: 20 ms for selected reference system configuration |

TABLE 2-continued

Case 1, InF, FR1, R.16 DL-TDOA/DL-AoD
Source NW/Destination NW - (RAN procedure is transparent to source/destination)
Positioning technique: DL-TDOA/DL-AoD, type DL
only, mode: UE-A, Initial and Final RRC States: CONNECTED

| Latency Components | Value Range, ms | Description of Latency Component |
|---|---|---|
| DL PRS processing and report delay | 959 symbols 68.5 ms | Depends on DL PRS configuration, MG configuration (length and period), and UE DL PRS processing capabilities(N, T). MG should accommodate DL BWP switching. The report delay is defined by 38.133 in Section 9.9.2.5. For considered, reference system configuration is equal to 3 * 20 + 8 + 0.5 = 68.5 ms |
| Step 7. DL PRS Measurement Report | 39.75 symbols 1.4196 ms | Value is provided for L1 components only |
| 7A: SR preparation time | 0 symbols 0 ms | Same as for 2A |
| 7B: SR alignment time | 2 symbols 0.0714 ms | Same as for 2B |
| 7C: SR transmission time | 1 symbol 0.0357 ms | Same as for 2C |
| 7D: SR processing time | 4.5 symbols 0.1607 ms | Same as for 2D |
| 7E: PDCCH preparation time | 2.25 symbols 0.0804 ms | Same as for 2E |
| 7F: PDCCH alignment time | 2 symbols 0.0714 ms | Same as for 2F |
| 7G: PDCCH transmission time | 1 symbol 0.0357 ms | Same as for 2G |
| 7H: PUSCH preparation time | 6.5 symbols 0.2321 ms | Same as for 2H |
| 7I: PUSCH alignment time | 7 symbol 0.2500 ms | Same as for 2I |
| 7J: PUSCH transmission time | 7 symbols 0.2500 ms | Same as for 2J |
| 7K: PUSCH processing time | 6.5 symbols 0.2321 ms | Same as for 2K |
| 7L: L2/L3 component: gNB LPP processing time | 84 symbols 3 ms | Not defined. 3 ms are assumed |

Based on the analysis provided above, the following observations on DL-TDOA, DL-AoD physical layer latency may be indicated:

(a) Summary of latency components:
(a.1) Sum of L1 components (except alignment time and report delay): 6.8571 ms;
(a.2) Sum of L2/L3 components: 23 ms;
(a.3) DL PRS alignment time: 20 ms; and
(a.4) DL PRS processing and report delay: 88.5 ms.
(b) Observations:
(b.1) If only L1 latency components are considered (except DL PRS alignment time and report delay), the DL-TDOA/DL-AoD physical layer latency can meet the 10 ms target;
(b.2) DL-TDOA/DL-AoD physical layer latency is dominated by the following latency components:
(b.2.1) Higher layer (LPP/RRC) processing/configuration time;
(b.2.2) Multiple DL/UL transactions before actual DL PRS processing, including location request, DL PRS assistance information request/configuration, measurement gap request/configuration, and measurement report;

(b.2.3) DL PRS alignment time:
(b.2.3.1) Rel. 16 Measurement Gap (MG) design has certain limitations in terms of MG periodicity, length, RRC configuration time. Therefore, it may not be possible to reduce latency even if DL PRS are allocated at a minimum period=4 ms.
(b.2.3.2) Periodic DL PRS allocation with low periodicity (minimum of 4 ms). Although it is beneficial for positioning latency, such DL PRS resource utilization is high.
(b.2.4) DL PRS report delay;
(b.2.4.1) According to the latest draft of core requirements in TS 38.133 for NR positioning RSTD measurements, the UE is expected to measure DL PRS-RSTD on four consecutive DL PRS resource periods, which imposes significant delay and thus need to be reconsidered in Rel. 17.

Latency Analysis of the Rel. 16 UL-TDOA/UL-AoA

The latency analysis for the Rel. 16 UL-TDOA or UL-AoA positioning methods are summarized in Table 3 below and is based on procedure and signaling shown in FIG. 11.

TABLE 3

Case 2, InF, FR1, R.16 UL-TDOA/UL-AoA
Source NW/Destination NW - (RAN procedure is transparent to source/destination)
Positioning technique: UL-TDOA/UL-AoA, type UL only, mode: UE-A,
Initial and Final RRC States: CONNECTED

| Latency Components | Value Range, ms | Description of Latency Component |
|---|---|---|
| Start trigger | | Reception by the gNB of the NRPPa measurement request message |
| Step 1. Configuration of SRS for positioning | | |
| 1A: PDCCH + PDSCH preparation time | 4.75 symbols 0,1696 ms | Not specified, For analysis, the assumption from [38.824] is used: UE's N2/2 + X for scheduling the initial PDSCH. X = 2/4/8 symbols for SCS = 30/60/120 kHz, respectively. N2 = 5.5 symbols@30 kHz SCS for UE capability 2 5.5/2 + 2 = 4.75 |
| 1B: PDCCH + PDSCH alignment time | 7 symbols 0.2500 ms | Depends on the configuration of PDCCH monitoring occasions, PDSCH transmission duration, time to slot boundary, and TDD configuration Worst case: 7 symbols@30 kHz for selected reference system configuration |
| 1C: PDCCH + PDSCH transmission time | 7 symbols 0.2500 ms | Depends on PDCCH + PDSCH transmission duration 7 symbols@30 kHz for selected reference system configuration |
| 1D: PDCCH + PDSCH processing time | 5.5 symbols 0.1964 ms | Specified as UE PDSCH processing Tproc,g1. Tproc, 1 = N1 + d11 + d2, d11 = 1 symbol, d2 = 0, N1 = 4.5 for 30 kHz SCS and UE capability 2 5.5 symbols@30 kHz for selected reference configuration |
| 1E: L2/L3 component: UE RRC configuration delay | 280 symbols 10 ms | Specified - 10 ms |
| Step 2 (Alt. 1): Activation of SRS for positioning (DCI) | | |
| 2A: PDCCH preparation time | 2.25 symbols 0.0804 ms | Not specified. For analysis, the assumptions from the [38.824] are used to derive PDCCH preparation time equal to N1/2: gNB's PUSCH-to-PDCCH processing time (PDCCH alignment has to be included separately) is UE's N1 + X; gNB's decoding time for the last PUSCH is UE's N1/2 + X; X = 2/4/8 symbols for SCS = 30/60/120 KHz, respectively. |

TABLE 3-continued

Case 2, InF, FR1, R.16 UL-TDOA/UL-AoA
Source NW/Destination NW - (RAN procedure is transparent to source/destination)
Positioning technique: UL-TDOA/UL-AoA, type UL only, mode: UE-A,
Initial and Final RRC States: CONNECTED

| Latency Components | Value Range, ms | Description of Latency Component |
|---|---|---|
| 2B: PDCCH alignment time | 2 symbols 0.0714 ms | Depends on the configuration of PDCCH monitoring occasions and TDD configuration |
| 2C: PDCCH transmission time | 1 symbol 0.0357 ms | 1 symbol for selected reference system configuration |
| 2D: PDCCH processing time | 3.25 symbols 0.1161 ms | Not specified: For analysis, it is assumed to be equal to 1/2 of UE PUSCH preparation time $T_{proc,2}$ = $N2 + d21 + d2$ (if no BWP switch) i.e. $T_{proc,2}/2$ $N2 = 5.5@30$ kHz, $d21 = 1$, $d2 = 0$. |
| Step 2'(Alt. 2): Activation of SRS for positioning (MAC CE) | | |
| 2'A: PDCCH + PDSCH preparation time | 4.75 symbols 0.1696 ms | Same as for 1A |
| 2'B: PDCCH + PDSCH alignment time | 7 symbols 0.2500 ms | Same as for 1B |
| 2'C: PDCCH + PDSCH transmission time | 7 symbols 0.2500 ms | Same as for 1C |
| 2'D: PDCCH + PDSCH processing time | 5.5 symbols 0.1964 ms | Same as for 1D |
| 2'E: L2/L3 component: UE MAC processing delay | 28 symbols 1 ms | Not defined: 1 ms is assumed |
| Step 3. SRS for positioning Tx & Rx | | |
| 3A: SRS for positioning preparation time | 0 ms | Not defined. 0 ms is assumed for analysis |
| 3B: SRS for positioning alignment time | 14 symbols 0.5 ms | Depends on SRS resource allocation. Worst case: 14 symbols for the selected reference configuration |
| 3C: SRS for positioning transmission time | 1 symbol 0.0357 | 1 symbol for the selected reference configuration |
| 3D: SRS for positioning processing time | [0.5 ms] | [Not defined: 0.5 ms is assumed The definition is in the scope of RAN WG4] |
| Step 4. gNB Measurement Report | | |
| 4A: L2/L3 component: gNB NRPPa preparation time | 3 ms | Not defined: 3 ms is assumed |
| End trigger | | The transmission by the gNB of the NRPPa measurement response message |

Based on the analysis provided above, the following observations on UL-TDOA, UL-AoA physical layer latency may be indicated:

(a) Summary of latency components: Sum of L1 components: 2,7678 ms; and Sum of L2/L3 components: 14 ms.

(b) Physical layer latency for UL-TDOA and UL-AoA is dominated by SRS for positioning configuration component (RRC configuration delay) that utilizes 10 out of 16 ms total latency for considered reference system configuration.

Latency Analysis of the Rel. 16 Multi-RTT

The latency analysis for the Rel. 16 Multi-RTT positioning method is summarized in Table 4 below and is based on the procedure and signaling shown in FIG. 12.

The latency for Multi-RTT positioning can be estimated as the sum of latency components for UL-TDOA and DL-TDOA positioning methods. In a best-case scenario, if DL and UL transactions are executed in parallel, the latency of multi-RTT can be estimated as max(DL-TDOA, UL-TDOA) latency components. In a worst-case scenario, it can be estimated as a sum of DL-TDOA and a sum of UL-TDOA latency components assuming that all transactions are performed consecutively. This analysis is presented in Table 4.

TABLE 4

Case 3, INF, FR1, R.16 Multi-RTT
Source NW/Destination NW - (RAN procedure is transparent to source/destination)
Positioning technique: Multi-RTT, type DL + UL, mode: UE-A,
Initial and Final RRC States: CONNECTED

| Latency Components | Value Range, ms | Description of Latency Component |
|---|---|---|
| Start trigger | | Reception by the gNB of the NRPPa measurement request message |
| Step 1. Configuration of SRS for positioning | L1: 0.8661 L2: 10.0 | L1: gNB signaling to UE to configure SRS for positioning - 0.5088 ms L2/L3: UE RRC configuration delay - 10 ms |
| Step 2: Activation of SRS for positioning (MAC CE) | L1: 0.8661 L2/L3: 1.0 | L1: gNB signaling to UE to activate SRS for positioning transmission - 0.5088 ms L2/L3: UE MAC CE processing delay - 1 ms |
| Step 3. SRS for positioning TX & RX | L1: 1.0357 | L1: transmission of SRS for positioning by UE and its reception by gNB - 1.0357 ms |
| Step 4. Assistance Information TX & RX | L1: 0.8661 L2/L3: 3.0 | L1: Deliver DL PRS assistance information to UE by gNB - 0.5088 ms L2/L3: UE LPP processing delay - 3 ms |
| Step 5. Location information request | L1: 0.8661 L2/L3: 3.0 | L1: gNB transmits to UE location request - 0.5088 ms L2/L3: UE LPP processing delay - 3 ms |
| Step 6. MG Request | L1: 1.4196 L2/L3: 1.0 | L1: UE requests gNB to provide MG - 1.0266 ms L2/L3: gNB MAC processing delay - 1 ms |
| Step 7. MG Configuration | L1: 0.8661 L2/L3: 10.0 | L1: gNB provides MG configuration to UE RRC signaling - 0.5088 ms L2/L3: UE RRC configuration delay - 10 ms |
| Step 8. DL PRS Processing | L1: 88.5 | DL PRS alignment time and DL PRS processing and report delay |
| Step 9. DL PRS Measurement Report | L1: 1.4196 L2/L3: 3.0 | L1: UE reports measurement results to gNB L2/L3: gNB LPP processing delay - 3 ms |
| End trigger | | The transmission by the gNB of the NRPPa measurement response message |

Enhancements for Latency Reductions of NR Positioning Protocols

The following techniques may be used for latency reduction in connection with NR positioning:

(1) Pre-configuration and minimization of DL/UL configuration signaling (DL/UL procedure transactions).

(a) Majority of DL PRS assistance information can be pre-configured to UE for each serving cell. Multiple DL PRS configurations can be associated with the DL PRS configuration ID.

(b) Majority of SRS for positioning configuration information can be pre-configured to UE for each serving cell. Multiple configurations of SRS for positioning can be associated with SRS for positioning configuration ID.

(c) Remaining information can be dynamically indicated to UE (e.g. DL PRS configuration ID and relative timing offset with respect to DL transmission activating DL PRS transmission).

(2) BWP switching—less operation.

(a) For a physical layer latency reduction, it is desirable to avoid BWP switching time overhead that can be achieved by an implementation.

(3) Measurement gaps (MG).

(a) MG-less operation. A UE may operate without measurement gaps (i.e., process DL PRS without MG configured). In some aspects, there may be no need for DL BWP switching to and from active DL BWP for DL PRS processing. In this regard, wideband DL PRS is transmitted within active DL BWP.

(b) Support and pre-configuration of semi-persistent and a-periodic MGs.

(c) UE may be preconfigured with a set of MG configurations each associated with MG configuration ID. In some aspects, the UE MG configuration ID can be dynamically signaled to the UE and may be associated with periodic, semi-persistent, or aperiodic MG configuration.

(d) MG configuration can be provided in advance and activated when it is appropriate.

(4) DL PRS alignment time.

(a) DL PRS alignment time can be reduced using dynamic DL PRS resource activation (e.g., DCI or MAC CE/RRC-based);

(b) Signaling of DL PRS configuration ID and relative timing offset with respect to DL transmission activating DL PRS transmission.

(5) DL PRS report delay.

(a) DL PRS report delays can be reduced through optimization of MGs settings;

(b) DL PRS report delay can be reduced through revised requirements. In some aspects, support of single-shot DL PRS processing on a resource may be configured (without a need to mandate 4 measurements per resource). In some aspects, reduced processing time may be used.

(6) Dynamic activation of DL PRS and SRS for positioning transmissions by gNB (e.g., DCI or MAC CE/RRC based).

(7) Dynamic scheduling request of DL PRS and/or SRS for positioning transmissions (e.g., SR for positioning or MAC CE based).

(8) gNB Location request indicating information i.e. scheduling UE measurement report transmission signaled by DCI, MAC CE, or RRC.

FIG. 13, FIG. 14, FIG. 15, FIG. 16, FIG. 17, and FIG. 18 illustrate corresponding diagrams 1300, 1400, 1500, 1600,

1700, and 1800 of example low latency NR positioning procedures, according to some embodiments.

To perform latency analysis for enhanced NR positioning solutions, the following assumptions may be used:

(a) gNB location request: 2 symbols. In some aspects, such request may provide activation of DL PRS, UL SRS transmission, and scheduling information for UE measurement report (e.g., resources for UE measurement report transmission can be associated with resources of SRS for positioning or directly indicated by DCI).

(b) DL PRS and UL SRS for positioning transmission are performed sequentially;

(c) No MG configuration and BWP switching considerations;

(d) New DL PRS resource configuration may be used as follows: 2 symbols, Comb-6, 4 symbols in total per DL PRS Resource Set;

(e) SRS for positioning configuration—same as in reference system configuration;

(f) New DL PRS processing delay—2 ms;

(g) UE measurement report;

(h) 7 symbols PUSCH duration (same as in reference system configuration); and (i) Other assumptions are the same as in reference system configuration.

TABLE 5

Case 3, InF, FR1, R17 NR Positioning
Source NW/Destination NW - (RAN procedure is transparent to source/destination)
Positioning technique: Multi-RTT, type DL + UL, mode: UE-A,
Initial and Final RRC States: CONNECTED

| Latency Components | Value Range, ms | Description of Latency Component |
|---|---|---|
| Start trigger | | Reception by the gNB measurement request message |
| Step 1. gNB location request | 24.25 symbols 0.8861 ms | Value is provided for L1 components only |
| 1A: PDCCH + PDSCH preparation time | 4.75 symbols 0.1696 ms | Not specified, For analysis, the assumption from [38.824] is used: UE's N2/2 + X for scheduling the initial PDSCH. X = 2/4/8 symbols for SCS = 30/60/120 kHz, respectively. N2 = 5.5 symbols@30 kHz SCS for UE capability 2 5.5/2 + 2 = 4.75 |
| 1B: PDCCH + PDSCH alignment time | 7 symbols 0.2500 ms | Depends on the configuration of PDCCH monitoring occasions, PDSCH transmission duration, time to slot boundary, and TDD configuration Worst case: 7 symbols@30 kHz for selected reference system configuration |
| 1C: PDCCH + PDSCH transmission time | 7 symbols 0.2500 ms | Depends on PDCCH + PDSCH transmission duration 7 symbols@30 kHz for selected reference system configuration |
| 1D: PDCCH + PDSCH processing time | 5.5 symbols 0.1964 ms | Specified as UE PDSCH processing Tproc,1. Tproc,1 = N1 + d11 + d2, d11 = 1 symbol, d2 = 0, N1 = 4.5 for 30 kHz SCS and UE capability 2 5.5 symbols@30 kHz for selected reference configuration |
| 1E: L2/L3 component UE MAC CE processing time | ~28 symbols 1 ms | In this analysis, MAC CE based on PDCCH + PDSCH is assumed for the gNB location request. Another possible option is to use PDCCH only that can further reduce latency |
| Step 2: DL PRS transmission | 64 symbols 2.2858 ms | Value is provided for L1 components only |
| 2A. DL PRS alignment time | 4 symbols 0.1429 ms | Worst case: 4 ms for selected reference system configuration to reflect slot boundary |
| 2B. DL PRS transmission time | 4 symbols 0.1429 ms | |
| 2C. DL PRS processing and report delay | [~56 symbols 2 ms] | [Not defined. It is assumed that new UE capabilities for low latency NR positioning are to be introduced. The definition is in the scope of RAN WG4] |
| Step 3. SRS for positioning transmission | 29 symbols 1.0357 ms | Value is provided for L1 components only |
| 3A: SRS for positioning preparation time | 0 ms | Not defined. 0 ms is assumed for analysis (can be prepared in advance, e.g. during DL PRS processing or earlier) |
| 3B: SRS for positioning alignment time | 14 symbols 0.5 ms | Depends on SRS resource allocation. Worst case: 14 symbols for the selected reference configuration |

TABLE 5-continued

Case 3, InF, FR1, R17 NR Positioning
Source NW/Destination NW - (RAN procedure is transparent to source/destination)
Positioning technique: Multi-RTT, type DL + UL, mode: UE-A,
Initial and Final RRC States: CONNECTED

| Latency Components | Value Range, ms | Description of Latency Component |
|---|---|---|
| 3C: SRS for positioning transmission time | 1 symbol 0.0357 | 1 symbol for the selected reference configuration |
| 3D: SRS for positioning processing time | [14 symbols 0.5 ms] | [Not defined: 0.5 ms is assumed. The definition is in the scope of RAN WG4] |
| Step 4. UE measurement report | 20.5 symbols 0.7321 ms | Value is provided for L1 components only |
| 4A: L2/L3 component MAC CE preparation | ~28 symbols 1 ms | In this analysis, MAC CE based on PUSCH is assumed. |
| 4B: PUSCH alignment time | 7 symbols 0.2500 ms | |
| 4C: PUSCH transmission time | 7 symbols 0.2500 ms | 7 symbols for selected reference system configuration |
| 4D: PUSCH processing time | 6.5 symbols 0.2321 ms | Not specified. For analysis, the assumption from the [38.824] is used. gNB's decoding time for the last PUSCH is UE's N1/2 + X; X = 2/4/8 symbols for SCS = 30/60/120 KHz, respectively. |
| End trigger | | Transmission by the gNB measurement response message |

Based on the analysis in Table 5 above, the following observations may be concluded:

(a) DL-TDOA latency=Step 1+Step 2+Step 4=3.8839 ins;

(b) UL-TDOA latency=Step 1+Step 2=1.9018 ins; and (c) Multi-RTT latency=Step 1+Step 2+Step 3=4.1875 ms (it may be assumed that Step 4 is done in parallel with Steps 3B, 3C, and 3D).

NR Positioning Latency Reduction for UEs in RRC_IDLE/INACTIVE States

In some embodiments, the disclosed techniques may provide support for NR positioning latency reduction and support of low latency positioning for UEs in RRC_IDLE/RRC_INACTIVE states. In some embodiments, the two-step or four-step RACH procedures can be enhanced for this purpose.

In terms of NR positioning enhancements, the support of the following functionality may be provided in connection with the disclosed techniques:

(a) Support of NR positioning techniques for UEs in RRC_IDLE or RRC_INACTIVE state w/ and w/o transition to RRC_CONNECTED state including the following enhancements;

(b) Transmission of SRS for positioning following PRACH and MSG-A transmission, where MSG-A(MSG1) can:

(b.1) indicate a request for UE positioning and target positioning requirements;

(b.2) provide information for SRS for positioning reception e.g. relative timing offset with respect to PRACH or MSG-A transmission;

(b.3) request transmission of DL-PRS, (b.4) provide measurements on DL PRS resources for NR positioning; and (b.5) provide RRM measurement on SSB to facilitate NR positioning procedure.

(c) Transmission of SRS for positioning triggered by signaling from serving gNB, where DCI, MSG-B(MSG2) or RRC/LPP signaling can:

(c.1) trigger SRS for positioning transmission and provide SRS for positioning configuration ID and relative timing offset;

(c.2) activate DL PRS transmission and provide DL PRS configuration ID and relative timing offset as well as dynamic, semi-persistent, or periodic MG pattern; and (c.3) provide measurement results from SRS for positioning, e.g. RTOA or gNB Rx-Tx time difference.

(d) Request of DL PRS allocation by UE and DL PRS activation by gNB that can be indicated by MAC CE in MSG-A, RRC resume request, or LPP signaling;

(e) UE DL PRS measurement;

(f) Scheduling info for UE measurement report that can be provided by:

(f.1) DCI for MSG-B;

(f.2) DCI for RRC Resume Request; and (f.3) MSG-B MAC CE.

(g) UE DL PRS report that can be provided using:

(g.1) SDT (small data transmission framework);

(g.2) MSG-B MAC CE;

(g.3) RRC_Resume Request message; and (g.4) LPP.

In some embodiments, a method for low latency NR positioning for RRC CONNECTED and RRC_IDEL/INACTIVE UEs includes pre-configuration and minimization of DL/UL configuration signaling (DL/UL procedure transactions). The method may include pre-configuration of DL PRS assistance information to UE for each potential serving cell. Multiple DL PRS configurations can be associated with the DL PRS configuration ID. The method may include pre-configuration of SRS for positioning information to UE for each potential serving cell. Multiple configurations of SRS for positioning can be associated with SRS for positioning configuration ID. In some aspects, the method may include remaining information that can be dynamically indicated to UE (e.g. DL PRS configuration ID and relative timing offset with respect to DL transmission activating DL PRS transmission; SRS for positioning configuration ID and relative timing offset with respect to DL transmission activating SRS for positioning transmission).

In some aspects, the method may include BWP switching—less operation. For physical layer latency reduction, it is desirable to avoid BWP switching time overhead that can be achieved by an implementation.

In some aspects, the method may include support and pre-configuration of a set of semi-persistent, a-periodic, and periodic MGs. In some aspects, the UE may be preconfigured with a set of MG configurations each associated with MG configuration ID. In some aspects, UE MG configuration ID can be dynamically signaled to UE and associated with periodic, semi-persistent, or aperiodic MG configuration. In some aspects, MG configuration can be provided in advance and activated when it is appropriate.

In some aspects, the method may include configuring measurement gaps (MG). In some aspects, an MG-less operation may be used. In some aspects, the UE may operate without measurement gaps (i.e., process DL PRS without MG configured). No need for DL BWP switching to and from active DL BWP for DL PRS processing. Wideband DL PRS may be transmitted within active DL BWP.

In some aspects, the method may include DL PRS alignment time reduction. In some aspects, DL PRS alignment time can be reduced using dynamic DL PRS resource activation (e.g. DCI or MAC CE/RRC based). In some embodiments, signaling of DL PRS configuration ID and relative timing offset with respect to DL transmission activating DL PRS transmission may be used.

In some aspects, the method may include DL PRS report delay reduction. In some aspects, DL PRS report delays can be reduced through optimization of MGs settings. In some aspects, DL PRS report delay can be reduced through revised requirements. In some aspects, support of single-shot DL PRS processing on a resource may be used (without a need to mandate 4 measurements per resource). In some aspects, new DL PRS processing capabilities with reduced DL PRS processing time may be used.

In some aspects, the method may include dynamic activation of DL PRS and SRS for positioning transmissions by gNB (e.g. DCI or MAC CE/RRC based). In some aspects, the method may include a dynamic scheduling request of DL PRS and/or SRS for positioning transmissions (e.g., SR for positioning or MAC CE based). In some aspects, the method may include a gNB location request indicating information (i.e., scheduling UE measurement report transmission signaled by DCI, MAC CE, or RRC).

In some aspects, the method may include support of low latency positioning for UEs in RRC_IDLE/RRC_INACTIVE states and includes enhancements of the two-step or four-step RACH procedures including the following functionality:

(a) Support of NR positioning techniques for UEs in RRC_IDLE or RRC_INACTIVE state w/ and w/o transition to RRC_CONNECTED state including the following enhancements.

(b) Transmission of SRS for positioning following PRACH and MSG-A transmission, where MSG-A(MSG1) can perform at least one of: indicate a request for UE positioning and target positioning requirements; provide information for SRS for positioning reception, e.g., relative timing offset with respect to PRACH or MSG-A transmission; request transmission of DL-PRS; provide measurements on DL PRS resources for NR positioning; and provide RRM measurement on SSB to facilitate NR positioning procedure.

(c) Transmission of SRS for positioning triggered by signaling from serving gNB, where DCI, MSG-B(MSG2) or RRC/LPP signaling can perform at least one of: trigger SRS for positioning transmission and provide SRS for positioning configuration ID and relative timing offset; activate DL PRS transmission and provide DL PRS configuration ID and relative timing offset as well as dynamic, semi-persistent or periodic MG pattern; or provide measurement results from SRS for positioning, e.g. RTOA or gNB Rx-Tx time difference.

(d) Request of DL PRS allocation by UE and DL PRS activation by gNB that can be indicated by MAC CE in MSG-A, RRC resume request, or LPP signaling.

(e) UE DL PRS measurement;

(f) Scheduling info for UE measurement report that can be provided by using at least one of: DCI for MSG-B; DCI signaling; DCI for RRC Resume Request; MSG-B MAC CE; and mapped with respect to allocated DL PRS or SRS for positioning transmission.

(g) UE DL PRS report that can be provided using at least one of: SDT (small data transmission framework); MSG-B MAC CE; RRC_Resume Request message; and LPP.

Figure 19:
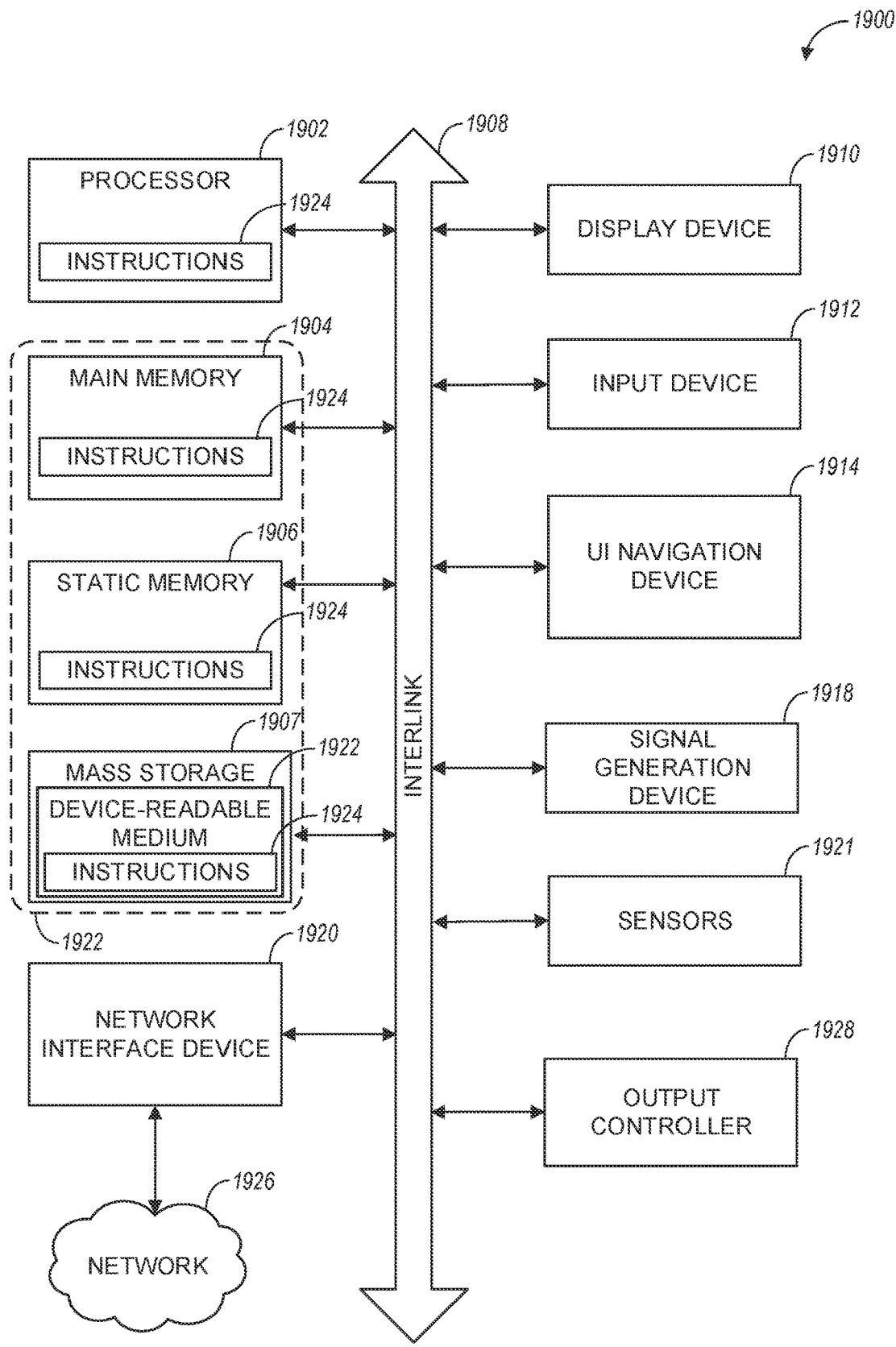
FIG. 19 illustrates a block diagram of a communication device such as an evolved Node-B (eNB), a new generation Node-B (gNB) (or another RAN node), an access point (AP), a wireless station (STA), a mobile station (MS), or a user equipment (UE), in accordance with some aspects.

FIG. 19 illustrates a block diagram of a communication device such as an evolved Node-B (eNB), a new generation Node-B (gNB) (or another RAN node), an access point (AP), a wireless station (STA), a mobile station (MS), or a user equipment (UE), in accordance with some aspects and to perform one or more of the techniques disclosed herein. In alternative aspects, the communication device 1900 may operate as a standalone device or may be connected (e.g., networked) to other communication devices.

Circuitry (e.g., processing circuitry) is a collection of circuits implemented in tangible entities of the device 1900 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 1900 follow.

In some aspects, the device 1900 may operate as a standalone device or may be connected (e.g., networked) to other devices. In a networked deployment, the communication device 1900 may operate in the capacity of a server communication device, a client communication device, or both in server-client network environments. In an example, the communication device 1900 may act as a peer communication device in a peer-to-peer (P2P) (or other distributed) network environment. The communication device 1900 may be a UE, eNB, PC, a tablet PC, an STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

The communication device (e.g., UE) 1900 may include a hardware processor 1902 (e.g., a central processing unit (CPU), a graphics processing unit (GPU), a hardware processor core, or any combination thereof), a main memory 1904, a static memory 1906, and a storage device 1907 (e.g., hard drive, tape drive, flash storage, or other block or storage devices), some or all of which may communicate with each other via an interlink (e.g., bus) 1908.

The communication device 1900 may further include a display device 1910, an alphanumeric input device 1912 (e.g., a keyboard), and a user interface (UI) navigation device 1914 (e.g., a mouse). In an example, the display device 1910, input device 1912, and UI navigation device 1914 may be a touchscreen display. The communication device 1900 may additionally include a signal generation device 1918 (e.g., a speaker), a network interface device 1920, and one or more sensors 1921, such as a global positioning system (GPS) sensor, compass, accelerometer, or another sensor. The communication device 1900 may include an output controller 1928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1907 may include a communication device-readable medium 1922, on which is stored one or more sets of data structures or instructions 1924 (e.g., software) embodying or utilized by any one or more of the techniques or functions described herein. In some aspects, registers of the processor 1902, the main memory 1904, the static memory 1906, and/or the storage device 1907 may be, or include (completely or at least partially), the device-readable medium 1922, on which is stored the one or more sets of data structures or instructions 1924, embodying or utilized by any one or more of the techniques or functions described herein. In an example, one or any combination of the hardware processor 1902, the main memory 1904, the static memory 1906, or the mass storage 1916 may constitute the device-readable medium 1922.

As used herein, the term "device-readable medium" is interchangeable with "computer-readable medium" or "machine-readable medium". While the communication device-readable medium 1922 is illustrated as a single medium, the term "communication device-readable medium" may include a single medium or multiple media (e.g., a centralized or distributed database, and/or associated caches and servers) configured to store the one or more instructions 1924. The term "communication device-readable medium" is inclusive of the terms "machine-readable medium" or "computer-readable medium", and may include any medium that is capable of storing, encoding, or carrying instructions (e.g., instructions 1924) for execution by the communication device 1900 and that causes the communication device 1900 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

Instructions 1924 may further be transmitted or received over a communications network 1926 using a transmission medium via the network interface device 1920 utilizing any one of a number of transfer protocols. In an example, the network interface device 1920 may include one or more physical jacks (e.g., Ethernet, coaxial, or phone jacks) or one or more antennas to connect to the communications network 1926. In an example, the network interface device 1920 may include a plurality of antennas to wirelessly communicate using at least one of single-input-multiple-output (SIMO), MIMO, or multiple-input-single-output (MISO) techniques.

In some examples, the network interface device 1920 may wirelessly communicate using Multiple User MIMO techniques.

The term "transmission medium" shall be taken to include any intangible medium that is capable of storing, encoding, or carrying instructions for execution by the communication device 1900, and includes digital or analog communications signals or another intangible medium to facilitate communication of such software. In this regard, a transmission medium in the context of this disclosure is a device-readable medium.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

Described implementations of the subject matter can include one or more features, alone or in combination as illustrated below by way of examples.

Example 1 is an apparatus for a user equipment (UE) configured for operation in a Fifth Generation New Radio (5G NR) network, the apparatus comprising: processing circuitry, wherein to configure the UE for low latency NR positioning in the 5G NR network, the processing circuitry is to: decode configuration signaling received from a base station, the configuration signaling including a measurement gap information and scheduling information for a UE measurement report; decode a downlink (DL) positioning reference signal (PRS) received from the base station; perform positioning measurements using the DL PRS, the positioning measurements performed based on a measurement gap corresponding to the measurement gap information; and encode the UE measurement report for an uplink (UL) transmission to the base station based on the scheduling information, the UE measurement report including the positioning measurements; and a memory coupled to the processing circuitry and configured to store the configuration signaling.

In Example 2, the subject matter of Example 1 includes, wherein the configuration signaling is a gNB-Location-Request message, and wherein the gNB-Location-Request message further includes DL PRS configuration information.

In Example 3, the subject matter of Example 2 includes, wherein the processing circuitry is configured to decode the DL PRS based on the DL PRS configuration information.

In Example 4, the subject matter of Examples 1-3 includes, wherein the UE measurement report is a DL PRS Reference Signal Received Power (RSRP) measurement report or DL PRS Reference Signal Time Difference (RSTD) measurement report.

In Example 5, the subject matter of Examples 1-4 includes, wherein the configuration signaling further includes a type of positioning method or a type of measurement.

In Example 6, the subject matter of Example 5 includes, wherein the processing circuitry is configured to perform the positioning measurements based on the type of positioning method or the type of measurement included in the configuration signaling.

In Example 7, the subject matter of Examples 5-6 includes, wherein: the type of positioning method is one of a DL Time Difference of Arrival (DL-TDOA) positioning or a DL Angle of Departure (DL-AOD) positioning; and the type of measurement is one of a DL PRS Reference Signal Received Power (RSRP) measurement report or a DL PRS Reference Signal Time Difference (RSTD) measurement report.

In Example 8, the subject matter of Examples 1-7 includes, wherein the configuration signaling further includes a sounding reference signal (SRS) identification information and an SRS offset.

In Example 9, the subject matter of Example 8 includes, wherein the processing circuitry is configured to: encode an SRS for a positioning transmission to the base station, the SRS based on the SRS identification information, and the positioning transmission based on the SRS offset.

In Example 10, the subject matter of Examples 1-9 includes, transceiver circuitry coupled to the processing circuitry; and one or more antennas coupled to the transceiver circuitry.

Example 11 is a non-transitory computer-readable storage medium that stores instructions for execution by one or more processors of a base station, the instructions to configure the base station for low latency NR positioning in a Fifth Generation New Radio (5G NR) network and to cause the base station to perform operations comprising: encoding configuration signaling for transmission to a user equipment (UE), the configuration signaling including a measurement gap information and scheduling information for a UE measurement report; encoding a downlink (DL) positioning reference signal (PRS) for transmission to the UE; and decoding a UE measurement report received via an uplink (UL) transmission from the UE, the UL transmission based on the scheduling information, and the UE measurement report including positioning measurements based on the measurement gap information.

In Example 12, the subject matter of Example 11 includes, wherein the configuration signaling further includes a sounding reference signal (SRS) identification information and an SRS offset.

In Example 13, the subject matter of Example 12 includes, the operations further comprising: decoding an SRS received from the UE during a positioning transmission, the SRS based on the SRS identification information, and the positioning transmission based on the SRS offset.

Example 14 is a non-transitory computer-readable storage medium that stores instructions for execution by one or more processors of a user equipment (UE), the instructions to configure the UE for low latency NR positioning in a Fifth Generation New Radio (5G NR) network and to cause the UE to perform operations comprising: decoding configuration signaling received from a base station, the configuration signaling including a measurement gap information and scheduling information for a UE measurement report; decoding a downlink (DL) positioning reference signal (PRS) received from the base station; performing positioning measurements using the DL PRS, the positioning measurements performed based on a measurement gap corresponding to the measurement gap information; and encoding the UE measurement report for an uplink (UL) transmission to the base station based on the scheduling information, the UE measurement report including the positioning measurements.

In Example 15, the subject matter of Example 14 includes, wherein the configuration signaling is a gNB-Location-Request message, and wherein the gNB-Location-Request message further includes DL PRS configuration information.

In Example 16, the subject matter of Example 15 includes, the operations further comprising: decoding the DL PRS based on the DL PRS configuration information.

In Example 17, the subject matter of Examples 14-16 includes, wherein the UE measurement report is a DL PRS Reference Signal Received Power (RSRP) measurement report or DL PRS Reference Signal Time Difference (RSTD) measurement report.

In Example 18, the subject matter of Examples 14-17 includes, wherein the configuration signaling further includes a type of positioning method or a type of measurement.

In Example 19, the subject matter of Example 18 includes, the operations further comprising: performing the positioning measurements based on the type of positioning method or the type of measurement included in the configuration signaling.

In Example 20, the subject matter of Examples 18-19 includes, wherein: the type of positioning method is one of a DL Time Difference of Arrival (DL-TDOA) positioning or a DL Angle of Departure (DL-AOD) positioning; and the type of measurement is one of a DL PRS Reference Signal Received Power (RSRP) measurement report or a DL PRS Reference Signal Time Difference (RSTD) measurement report.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. An apparatus for a user equipment (UE) configured for operation in a Fifth Generation New Radio (5G NR) network, the apparatus comprising:
   processing circuitry, wherein to configure the UE for low latency NR positioning in the 5G NR network, the processing circuitry is to:
   decode configuration signaling received from a base station, the configuration signaling including measurement gap information, scheduling information for a UE measurement report, and a sounding reference signal (SRS) configuration information for an SRS for positioning;
   decode a downlink (DL) positioning reference signal (PRS) received from the base station;
   perform positioning measurements using the DL PRS, the positioning measurements performed based on a measurement gap corresponding to the measurement gap information; and
   encode the SRS for positioning and the UE measurement report for an uplink (UL) transmission to the base station based on the scheduling information, the UE measurement report including the positioning measurements, and the SRS for positioning based on the SRS configuration information; and
   a memory coupled to the processing circuitry and configured to store the configuration signaling.

2. The apparatus of claim 1, wherein the configuration signaling is a gNB-Location-Request message, and wherein the gNB-Location-Request message further includes DL PRS configuration information.

3. The apparatus of claim 2, wherein the processing circuitry is configured to:
   decode the DL PRS based on the DL PRS configuration information.

4. The apparatus of claim 1, wherein the UE measurement report is a DL PRS Reference Signal Received Power (RSRP) measurement report or DL PRS Reference Signal Time Difference (RSTD) measurement report.

5. The apparatus of claim 1, wherein the configuration signaling further includes a type of positioning method or a type of measurement.

6. The apparatus of claim 5, wherein the processing circuitry is configured to:
   perform the positioning measurements based on the type of positioning method or the type of measurement included in the configuration signaling.

7. The apparatus of claim 5, wherein:
   the type of positioning method is one of a DL Time Difference of Arrival (DL-TDOA) positioning or a DL Angle of Departure (DL-AOD) positioning; and
   the type of measurement is one of a DL PRS Reference Signal Received Power (RSRP) measurement report or a DL PRS Reference Signal Time Difference (RSTD) measurement report.

8. The apparatus of claim 1, wherein the SRS configuration information includes a sounding reference signal (SRS) identification information and an SRS offset.

9. The apparatus of claim 8, wherein the processing circuitry is configured to:
   encode the SRS for the UL transmission to the base station, the SRS based on the SRS identification information, and the UL transmission based on the SRS offset.

10. The apparatus of claim 1, further comprising:
    transceiver circuitry coupled to the processing circuitry; and
    one or more antennas coupled to the transceiver circuitry.

11. A non-transitory computer-readable storage medium that stores instructions for execution by one or more processors of a base station, the instructions to configure the base station for low latency NR positioning in a Fifth Generation New Radio (5G NR) network and to cause the base station to perform operations comprising:
    encoding configuration signaling for transmission to a user equipment (UE), the configuration signaling including measurement gap information, scheduling information for a UE measurement report, and a sounding reference signal (SRS) configuration information for an SRS for positioning;
    encoding a downlink (DL) positioning reference signal (PRS) for transmission to the UE; and
    decoding the SRS for positioning and a UE measurement report received via an uplink (UL) transmission from the UE, the UL transmission based on the scheduling information, the UE measurement report including positioning measurements based on the measurement gap information, and the SRS for positioning based on the SRS configuration information.

12. The non-transitory computer-readable storage medium of claim 11, wherein the SRS configuration information includes a sounding reference signal (SRS) identification information and an SRS offset.

13. The non-transitory computer-readable storage medium of claim 12, the operations further comprising:
  decoding the SRS received from the UE during the UL transmission, the SRS based on the SRS identification information, and the UL transmission based on the SRS offset.

14. A non-transitory computer-readable storage medium that stores instructions for execution by one or more processors of a user equipment (UE), the instructions to configure the UE for low latency NR positioning in a Fifth Generation New Radio (5G NR) network and to cause the UE to perform operations comprising:
  decoding configuration signaling received from a base station, the configuration signaling including measurement gap information, scheduling information for a UE measurement report, and a sounding reference signal (SRS) configuration information for an SRS for positioning;
  decoding a downlink (DL) positioning reference signal (PRS) received from the base station;
  performing positioning measurements using the DL PRS, the positioning measurements performed based on a measurement gap corresponding to the measurement gap information; and
  encoding the SRS for positioning and the UE measurement report for an uplink (UL) transmission to the base station based on the scheduling information, the UE measurement report including the positioning measurements, and the SRS for positioning based on the SRS configuration information.

15. The non-transitory computer-readable storage medium of claim 14, wherein the configuration signaling is a gNB-Location-Request message, and wherein the gNB-Location-Request message further includes DL PRS configuration information.

16. The non-transitory computer-readable storage medium of claim 15, the operations further comprising:
  decoding the DL PRS based on the DL PRS configuration information.

17. The non-transitory computer-readable storage medium of claim 14, wherein the UE measurement report is a DL PRS Reference Signal Received Power (RSRP) measurement report or DL PRS Reference Signal Time Difference (RSTD) measurement report.

18. The non-transitory computer-readable storage medium of claim 14, wherein the configuration signaling further includes a type of positioning method or a type of measurement.

19. The non-transitory computer-readable storage medium of claim 18, the operations further comprising:
  performing the positioning measurements based on the type of positioning method or the type of measurement included in the configuration signaling.

20. The non-transitory computer-readable storage medium of claim 18, wherein:
  the type of positioning method is one of a DL Time Difference of Arrival (DL-TDOA) positioning or a DL Angle of Departure (DL-AOD) positioning; and
  the type of measurement is one of a DL PRS Reference Signal Received Power (RSRP) measurement report or a DL PRS Reference Signal Time Difference (RSTD) measurement report.

\* \* \* \* \*